United States Patent [19]

Rosheim et al.

[11] Patent Number: 4,911,033

[45] Date of Patent: Mar. 27, 1990

[54] ROBOTIC MANIPULATOR

[75] Inventors: Mark E. Rosheim, St. Paul; Hans W. Trechsel, Rockford, both of Minn.

[73] Assignee: Ross-Hime Designs, Incorporated, Minneapolis, Minn.

[21] Appl. No.: 292,697

[22] Filed: Jan. 3, 1989

[51] Int. Cl.$^4$ .................. G05G 11/00; B25J 17/02
[52] U.S. Cl. ........................ 74/479; 901/23; 901/25; 901/28; 901/29
[58] Field of Search ............. 74/479; 901/23, 28, 901/29, 25, 19, 21, 22, 24, 26

[56] References Cited

U.S. PATENT DOCUMENTS

| 4,494,417 | 1/1985 | Larson et al. | 901/28 X |
|---|---|---|---|
| 4,686,866 | 8/1987 | Rosheim | 74/479 |
| 4,723,460 | 2/1988 | Rosheim | 74/479 |
| 4,729,253 | 3/1988 | Rosheim | 74/479 |
| 4,744,264 | 5/1988 | Milenkovic | 74/479 |
| 4,805,477 | 2/1989 | Akeel | 901/28 X |

FOREIGN PATENT DOCUMENTS 0208495 6/1986 European Pat. Off. .

OTHER PUBLICATIONS

"Planetary Gear Drives," Promotional Material Published by Trogetec Inc., Riverton, Wy., 08–26–88.

Primary Examiner—Allan D. Herrmann
Attorney, Agent, or Firm—Kinney & Lange

[57] ABSTRACT

A mechanical manipulator having a joint with a base support and an output support each of which has an orthogonal pivot connection arrangement connecting them in one axis to a common joining arrangement connecting them in an orthogonal axis through which they are movably joined, there being a pair of guides with each rotatably connected to one of the supports and movably joined with each other. A plurality of such joints joined with one another can be provided between two rotary interfaces.

44 Claims, 16 Drawing Sheets

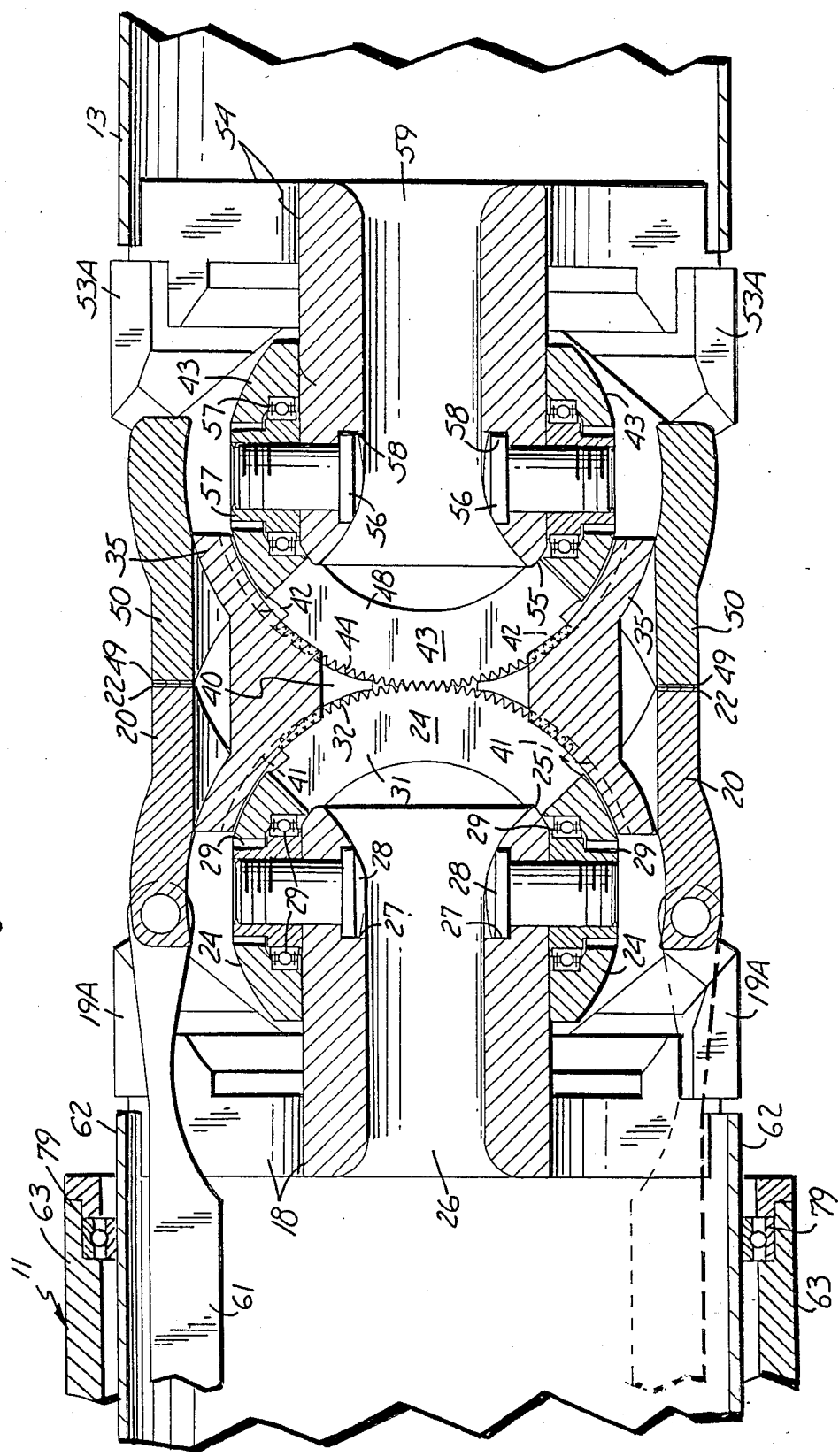

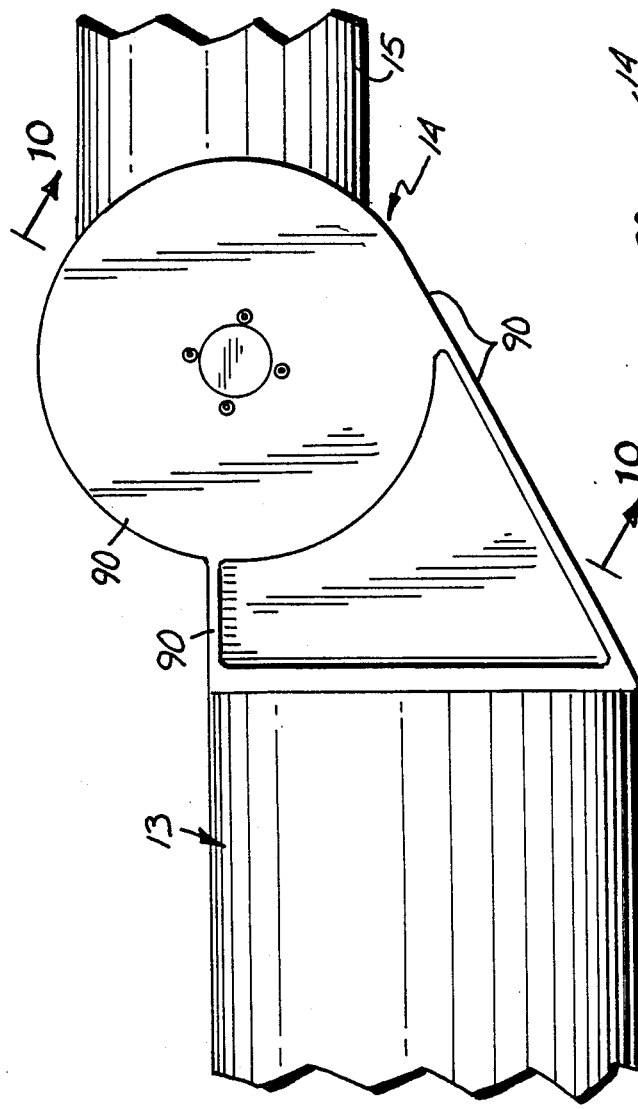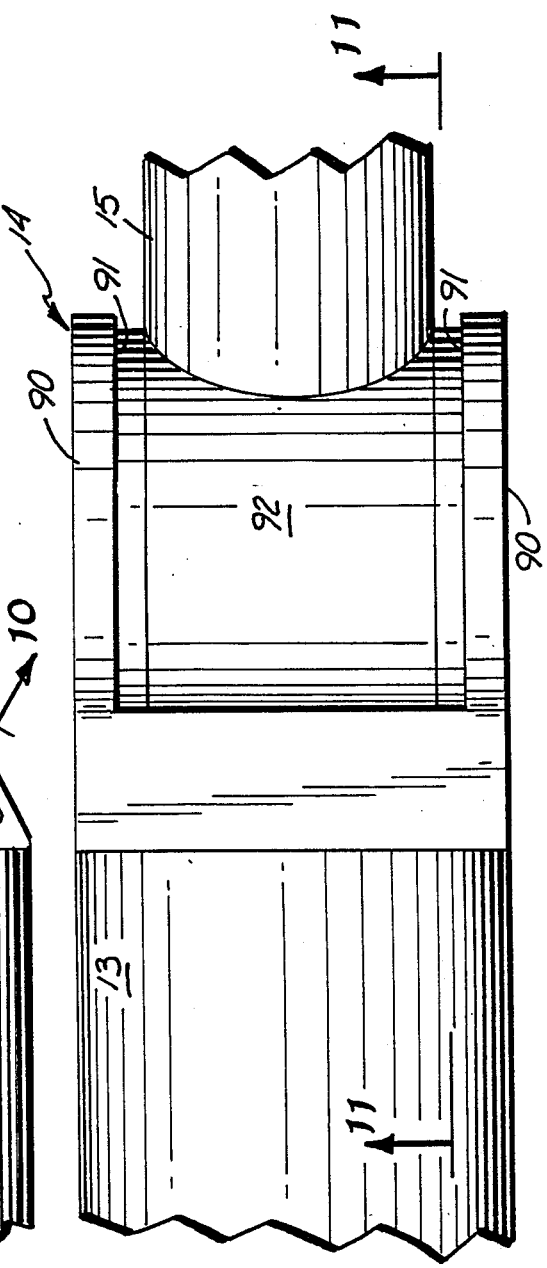

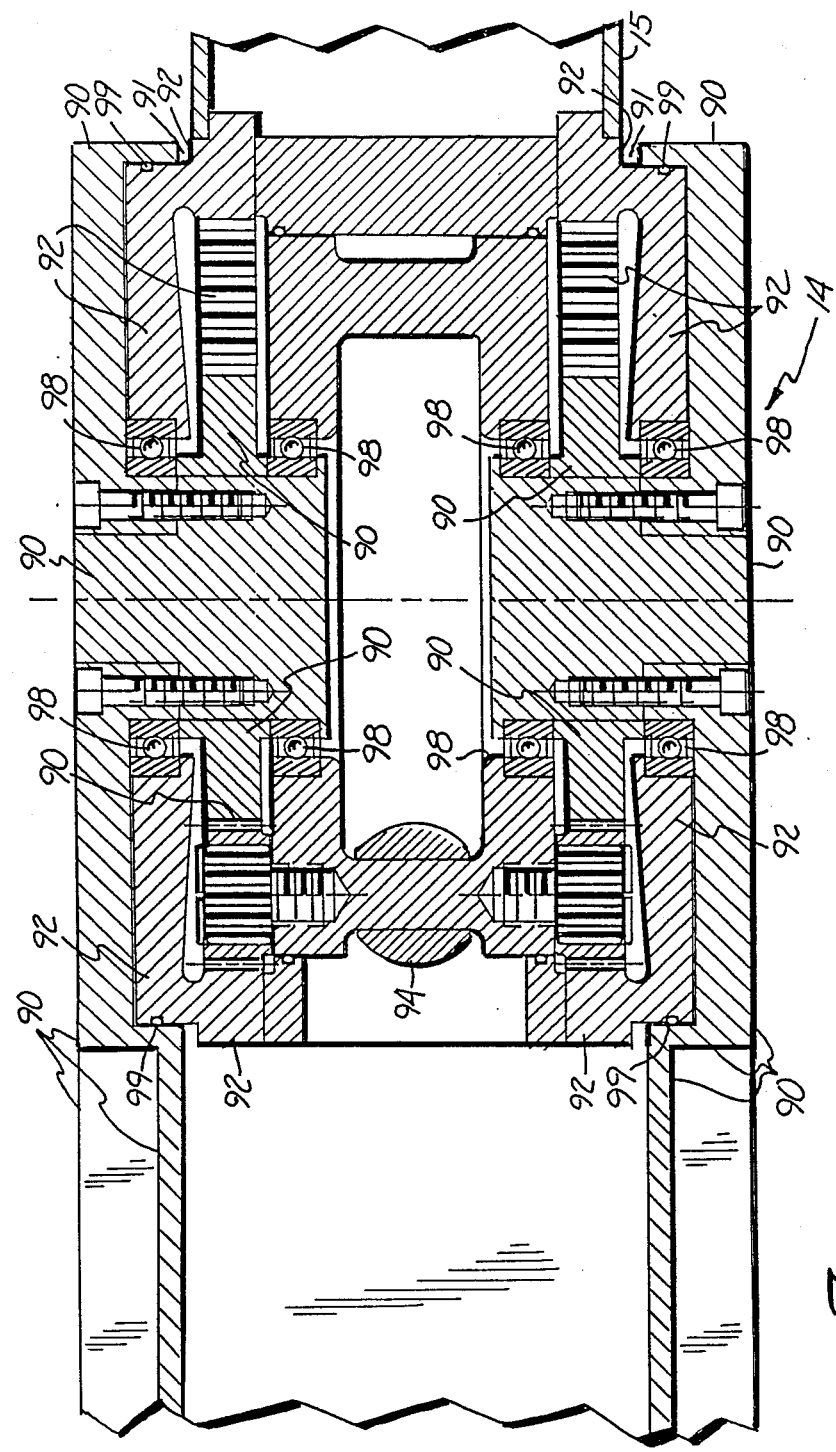

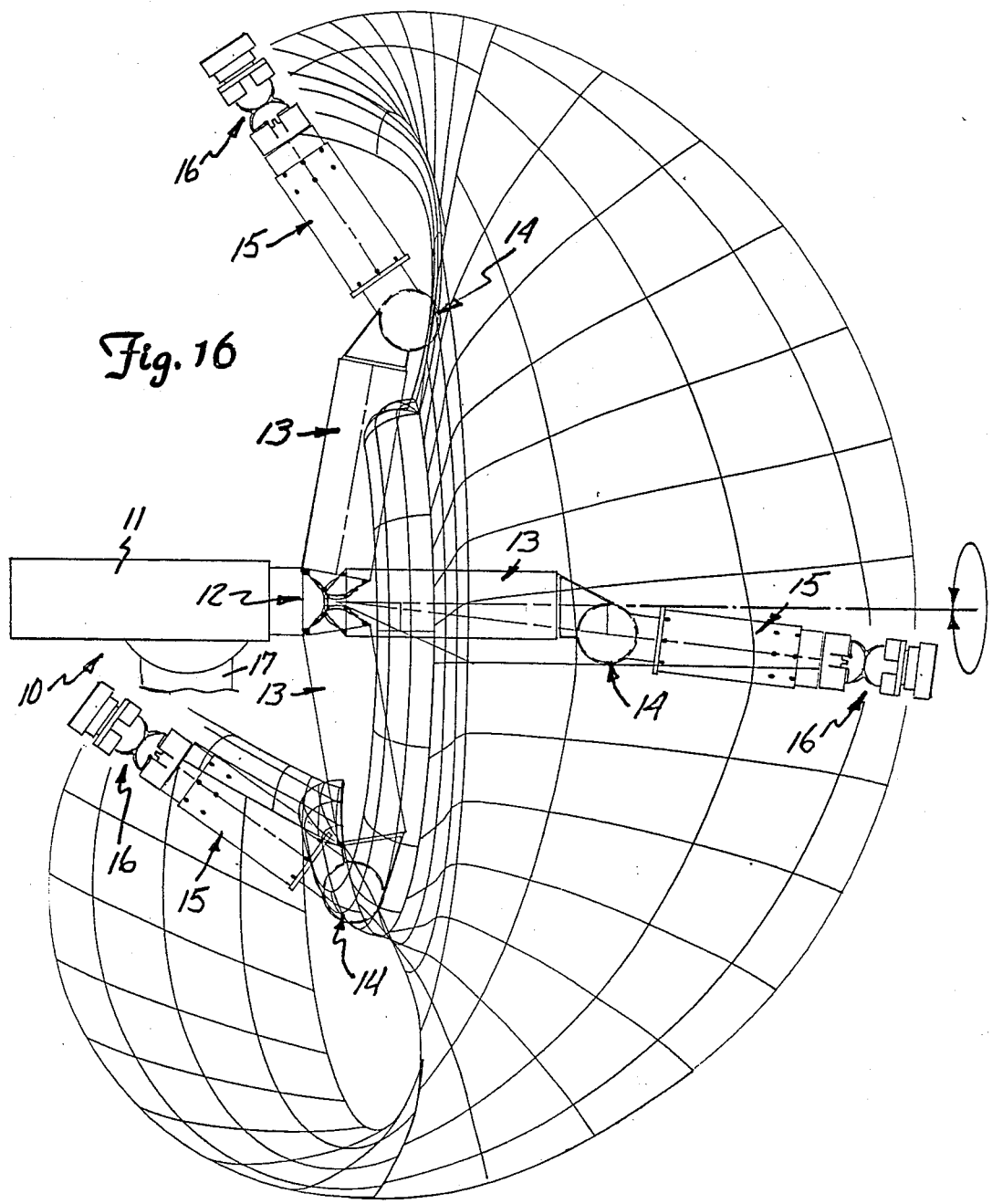

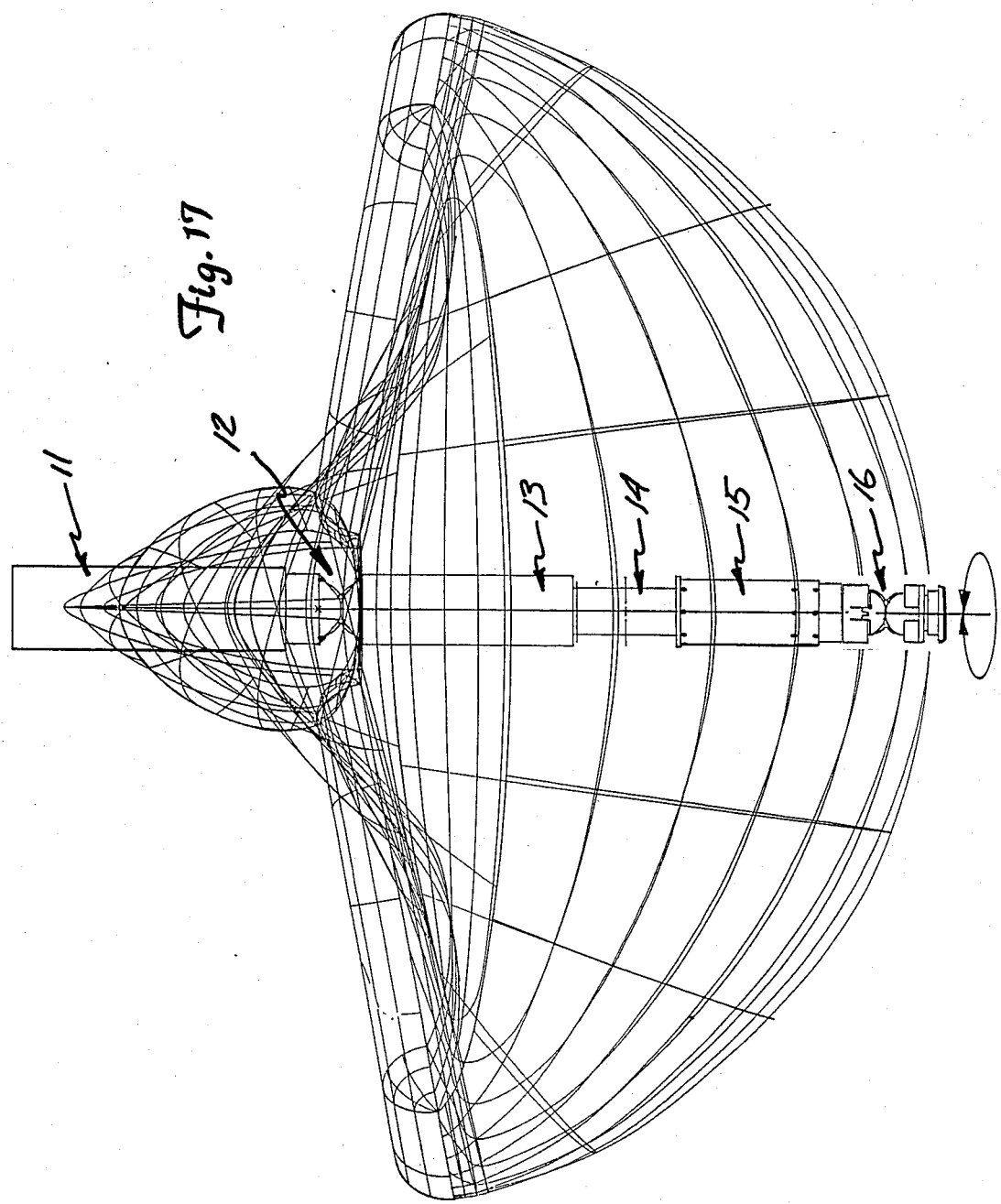

ately connected to one of the supports and movably joined with each other, these guide means each being positioned about a corresponding one of the orthogonal connection means. The orthogonal connection means can be movably joined with each other through use of gear teeth, as can the guide means. A plurality of such joints joined with one another can be provided between two rotary interfaces.

ROBOTIC MANIPULATOR

BACKGROUND OF THE INVENTION

The present invention relates to controlled motion mechanical members used as a mechanical manipulator and, more particularly, to a motion controllable, anthropomorphic mechanical manipulator providing some of the capabilities of a human arm.

A strong desire for increased automation in the work place, and a need for remotely operable mechanical actuators, along with an increased ability to control such mechanical manipulators, has lead to substantial efforts in the development of robotics. As a result, substantial advances have occurred in many aspects of robotics.

One aspect permeating robotics is the controlling of mechanical manipulators, the portion of a robot used to change the position or orientation of selected objects. Ultimately, such manipulators are desired to have capabilities similar to those of a human arm, wrist and hand, or portions thereof.

Providing a mechanical manipulator simulating a human arm presents a difficult design problem. The human shoulder and the human wrist each can be considered to have three degrees of freedom in motion possibilities available to it, and the elbow can be considered to have a single degree of freedom in its possible motion. A number of mechanical joints for mechanical manipulators have been proposed which attempt to exhibit three degrees of freedom, and some of these have actually achieved such a capability. Such a joint typically has a base upon which one side of the joint is fastened, and from which a force imparting arrangement is provided to operate movable members in this fastened portion of the joint. Mechanical transmission arrangements then couple this motion on this fastened side of the joint to the controlled side of the joint to cause that portion to correspondingly move. Mechanical transmission arrangements so operating the controlled side of the joint have been of many kinds, including gears.

However, such joints have often been constructed using a substantial number of parts causing significant expense, and with the result that they are often difficult to assemble. Further, such joints often fail to have the controlled portion thereof exhibit the desired dexterity and range of motion. In addition, the "stiffness" of such joints, i.e. their ability to have the controlled portion hold a particular position with little displacement therefrom despite substantial forces occurring on the output end of this controlled portion, is often seriously deficient. Thus, there is desired a joint overcoming such deficiencies so that an arm-like mechanical manipulator can be provided with motion possibilities substantially equivalent to that of a human arm, and to have the controlled portion thereof be maintainable in a selected position despite substantial forces occurring thereon.

SUMMARY OF THE INVENTION

The present invention provides a mechanical manipulator having a joint comprising a base support and a manipulable, or controllable, output support each of which has an orthogonal pivot connection arrangement connecting them in one axis to a common joining arrangement in an orthogonal axis, the two orthogonal connection means being movably joined with each other through this joining means. A pair of guide means

BRIEF DESCRIPTION OF THE DRAWINGS

FIGS. 9A and 9B show a portion of the apparatus of FIG. 1, FIG. 10 shows a cross section view of the apparatus shown in FIG. 9A, FIG. 16 shows the apparatus of FIG. 1 with a graph superimposed thereon depicting its vertical range of motion, and FIG. 17 shows the apparatus of FIG. 1 with a graph superimposed thereon depicting its horizontal range of motion.

DETAILED DESCRIPTION OF THE PREFERRED EMBODIMENTS

Figure 1:
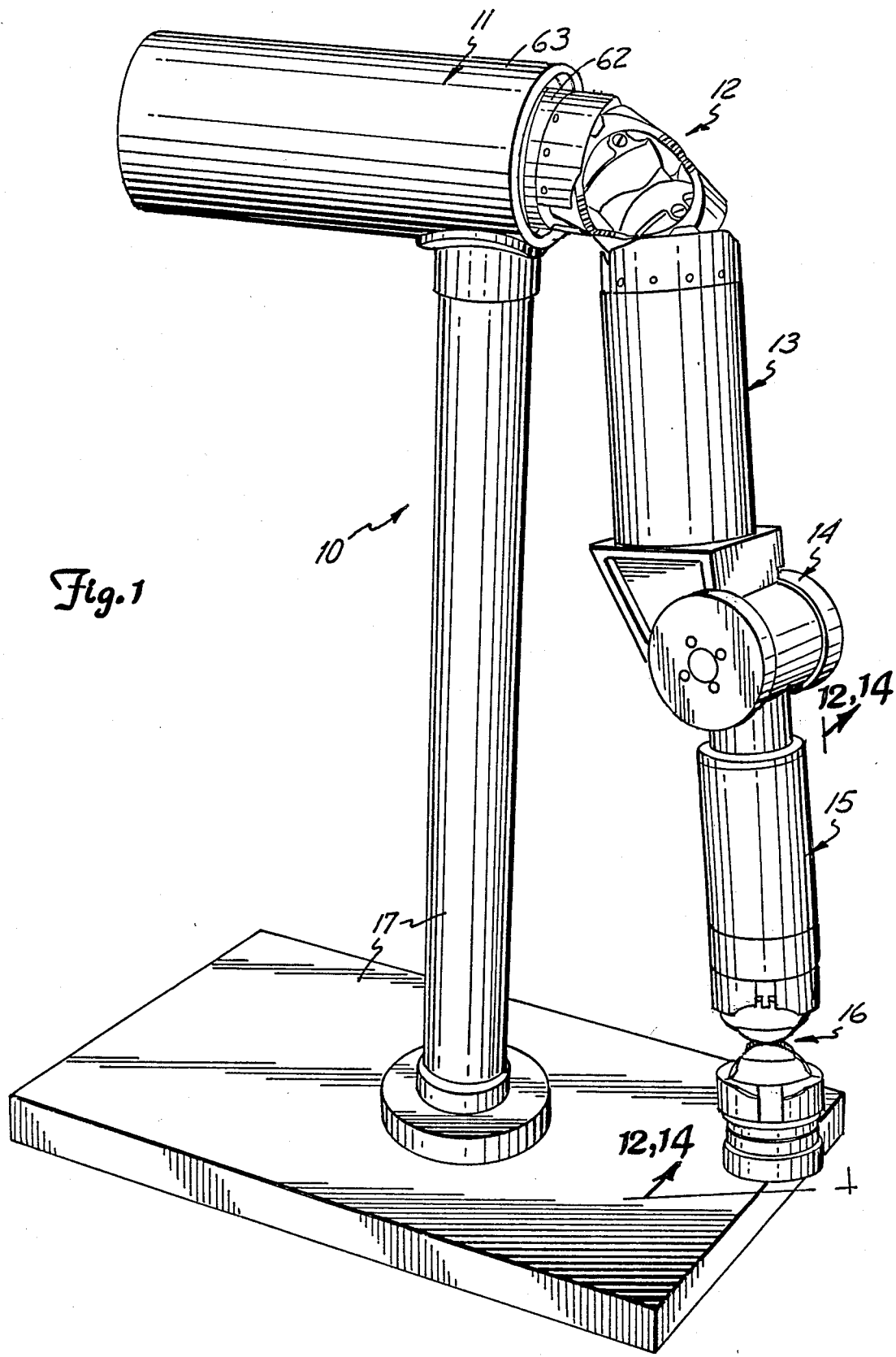
FIG. 1 shows a mechanical manipulator embodying the present invention.

FIG. 1 shows a portion of a mechanical manipulation system, 10, which bears some similarities to a human shoulder, upper arm, elbow, forearm, and wrist. Manipulation system 10 extends from a manipulation base or support arrangement, 11, to which there is rotatably attached a shoulder-like joint, 12. On the other side of joint 12 there is an upper arm-like portion, or a first extension, 13, which can be cased to move angularly with respect to base 11 through actuators operating joint 12. An elbow-like joint, 14, is attached between extension 13 and a forearm-like portion, or second extension, 15. Extension 15 can be caused to rotate about a single axis by an actuator operating joint 14.

A wrist-like joint 16, is attached to the other end of second extension 15. The opposite side of joint 16 can again be manipulated to selected angular positions with respect to extension 15 by operating actuators connected to joint 16.

The portions of manipulation system 10 are supported on a platform and vertical support arrangement forming a stand, 17. Manipulation base 11 is mounted on the vertical portion of stand 17 to support it at a height desired above the platform portion of stand 17.

Figure 2:
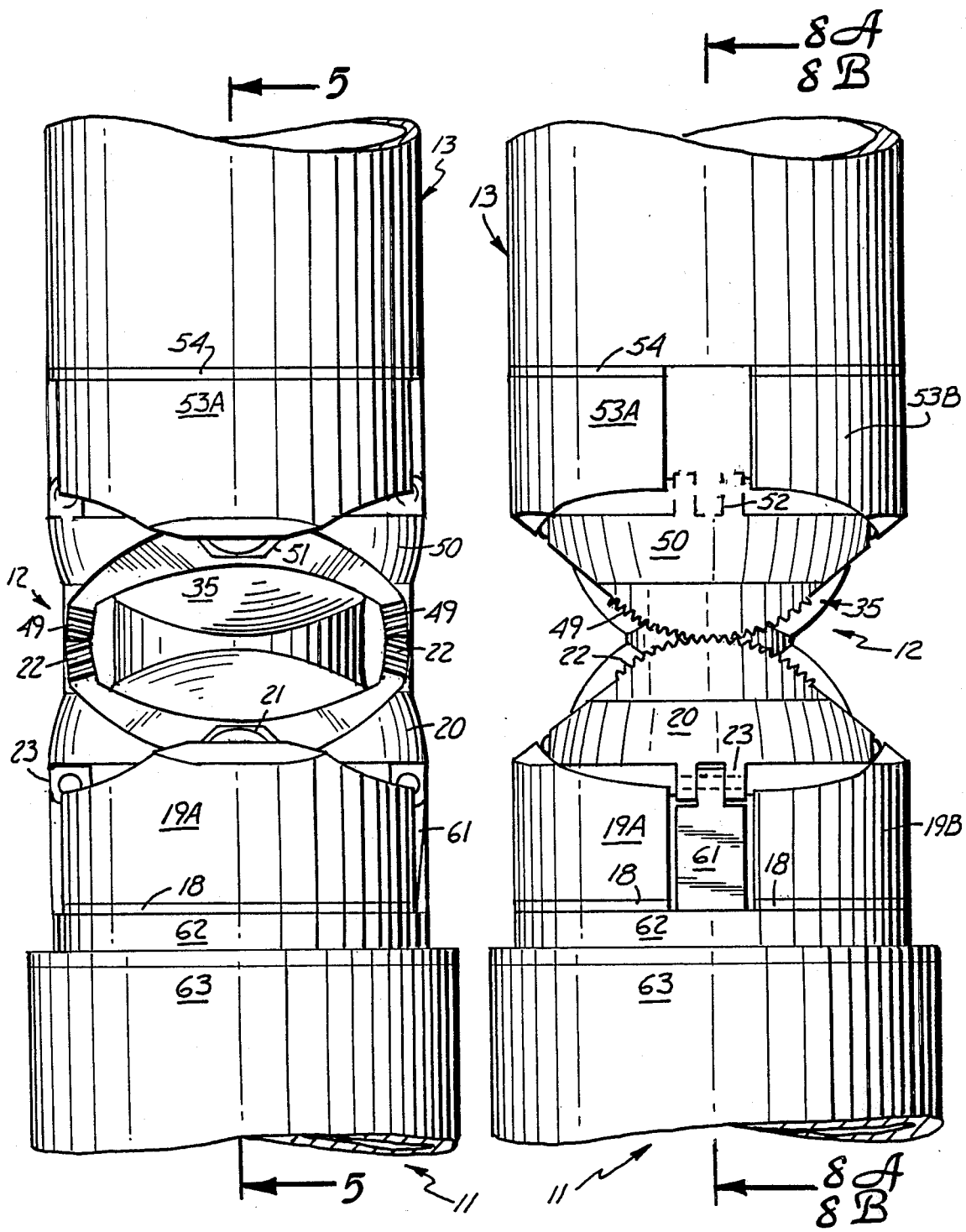
FIGS. 2A and B show a portion of the apparatus of FIG. 1.

Shoulder joint 12 is shown in a more detailed view in FIGS. 2A and 2B. There, a portion of base 11 and a portion of extension 13 are shown with joint 12 located therebetween. Joint 12 is also shown in greater detail in the exploded view of FIG. 3 and in the partly cut away pictorial view of FIG. 4 with the same designation being used in each of these figures for the same joint 12 component. The view in FIGS. 2A and 2B is such that extension 13 and base 11 are aligned with one another, but FIG. 4 shows joint 12 operated with that portion which would have extension 13 mounted thereon being at an angle with respect to that portion which would be attached to base 11.

Figure 3:
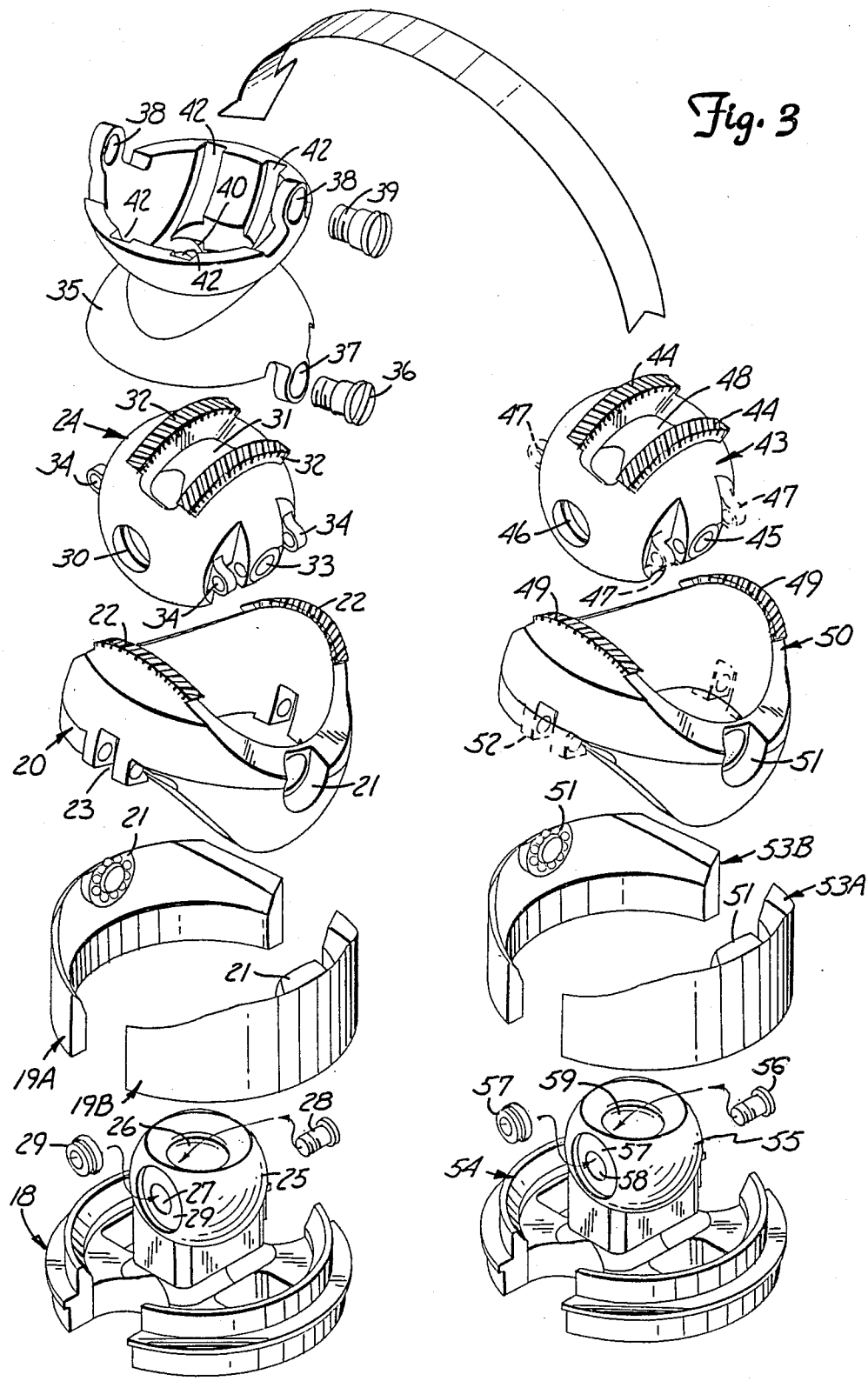
FIG. 3 shows an exploded view of a portion of the apparatus of FIG. 1.

FIG. 3 shows a base support, 18, which is rotatably attached about an axis to manipulator support 11, this axis being a vertical axis in the representations of joint 12 and support 18 shown in FIGS. 2A and 2B. Base support 18 can be seen also in FIG. 4, but here are no portions of manipulator base 11 shown in that view. Supplementary base supports, 19A and 19B, shown in FIGS. 2A, 2B, 3 and 4, are fixedly mounted in base support 18 to form an extended base support.

A guide means, 20, in these figures, provided for the base side of joint 12, is mounted between base extensions 19A and 19B in ball bearing arrangements, 21. This allows guide means 20 to rotate about the axis defined by the centers of the bearing races of bearing arrangements 21. Cylindrical shell guide means 20 has two sets of helical gear teeth, 22, on the upper end surface thereof in FIG. 3. These helical teeth are set at a diagonal with respect to the surface so that the two sets of gear teeth together form a gear set operating similarly to a herringbone gear. A connection point formed by lugs, 23, is provided for an actuator means, not shown in that figure, to be pivotally or rotatably connected to guide means 20. The end surface on which gear teeth sets 22 are formed there follows a curve which would be formed of the intersection of two cylindrical surfaces, one defined by guide means 20 and the other oriented perpendicularly thereto, i.e. a circular arc projected onto the first cylindrical surface.

Figure 4:
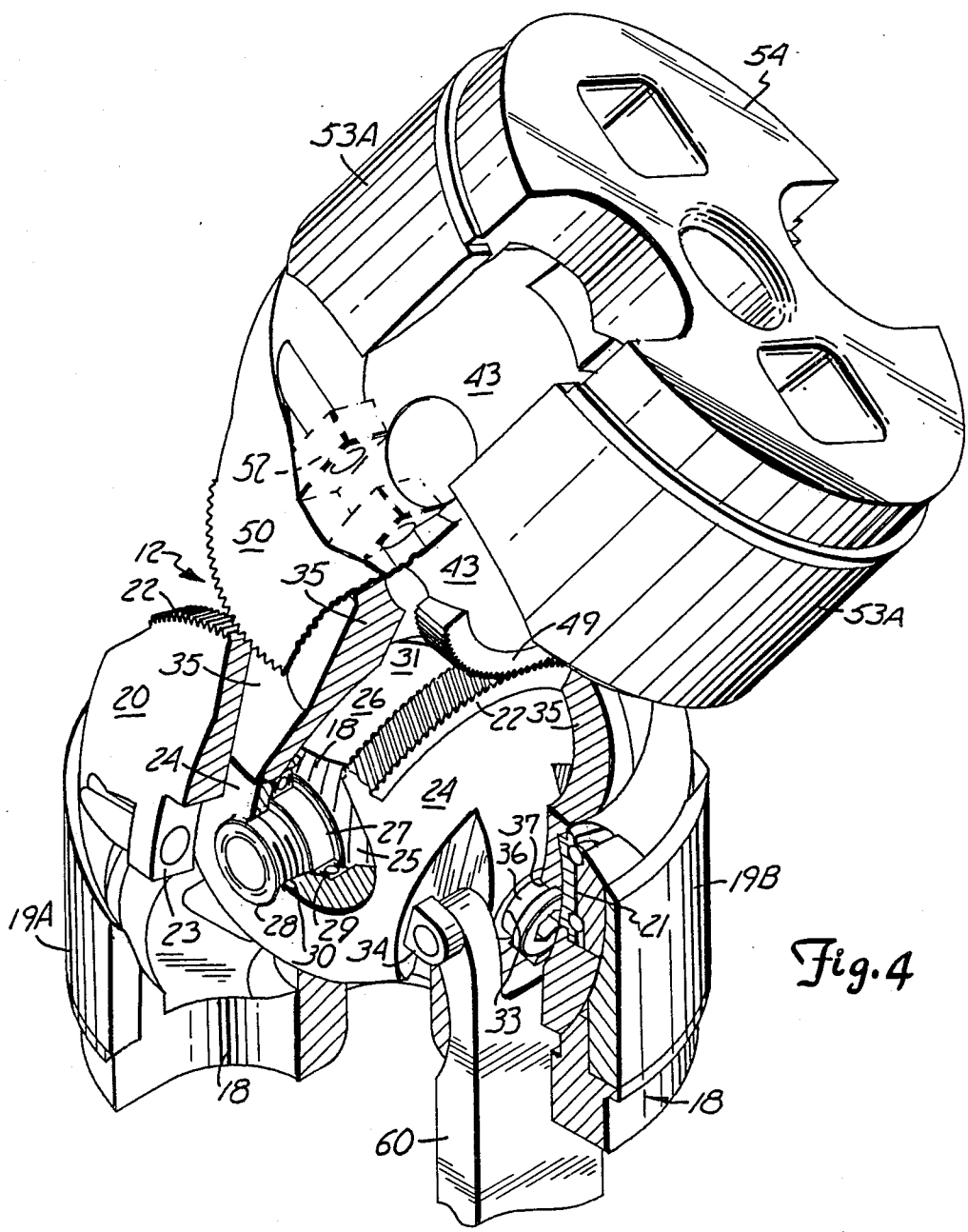
FIG. 4 shows a cut away pictorial representation of a portion of the apparatus of FIG. 1.

A partial spherical shell member, 24, is shown in FIGS. 3 and 4 which serves as a gimbal ring, as well as a drive member, and which fits over a truncated spherical portion, 25, of base support 18 elevated over an attachment portion thereof. Truncated spherical portion 25 has an opening, 26, extending vertically therethrough in FIG. 3 and continuing through the remaining portions of base 18. A pair of further openings, 27, are located in truncated spherical portion 25 on either side thereof that are commonly centered about an axis perpendicular to that of opening 26. Openings 27 are provided in truncated spherical portion 25 to permit using screws, 28, therethrough to attach bearing arrangements, 29, a pair of these being used in each one of a pair of corresponding openings, 30, in spherical shell 24. This pair of bearing and screw arrangements is used to rotatably fasten spherical shell 24 about truncated spherical portion 25 so that it can rotate about the axis defined by the centers of openings 27 commonly with the centers of openings 30.

Spherical shell 24 has a further opening, 31, through which opening 26 of spherical portion 25 is accessible. On either side of opening 31 is one of two sets of gear teeth, 32, following tracks paralleling one another which are also parallel to the axis defined by the centers of openings 30 in spherical shell 24. These ear teeth again are helical gears, and are slanted diagonally to the direction of these tracks so as to together form a gear tooth set operating like a herringbone gear.

A further pair of openings, 33, in spherical shell 24, with threaded sides, is shown in FIG. 3 which have centers which define an axis which is perpendicular to, or orthogonal to, the axis defined by the centers of openings 30 in that shell. Openings 33 are provided between lugs, 34, to be used for connecting joint operating actuators, as will be described below. Openings 33 are used to attach a gimbal connector, 35, shown in FIGS. 2A, 2B, 3 and 4, to spherical shell 24 through the use of a pair of screws, 36, each having a bearing surface along the shank thereof near the head but threaded at the opposite ends thereof. Each screw 36 fits through one of a pair of openings, 37, in the partial spherical shell forming one end of connector 35 so that the sides of openings 37 ar mated with the bearing surfaces of screws 36. The threaded portions of screws 36 are screwed in threaded openings 33 to join connector 35 with spherical shell 24. Thus, connector 35 can rotate about an axis orthogonal to that in which partial spherical shell 24 can rotate about truncated spherical portion 25 of base support 18.

The components just described in FIGS. 2A, 2B, 3 and 4, forming the base side of joint 12, have substantially identical counterparts forming the manipulable side of joint 12 with connector 35 common to each side. Thus, connector 35, in addition to the partial spherical shell on one end thereof which attaches to spherical shell 24, also has a partial spherical shell on the opposite end thereof as an integral part thereof. This opposite end partial spherical shell has openings, 38, into which are provided screws, 39, for attaching to connector 35 a further partial spherical shell serving as a gimbal on the manipulable side of joint 12. Screws 39 again have a bearing surface near the heads thereof and threaded opposite ends.

Connector 35 has an opening, 40, in the center thereof toward which a first pair of parallel slots, 41, lead that are located in the lower partial spherical shell end of connector 35. A further pair of parallel slots, 42, lead to opening 40 in the upper partial spherical shell end of that connector. Slots 41 cannot be seen in these views, but can be seen in a later view. Slots 41 correspondingly accommodate the two tracks of gear tooth sets 32 therein.

Slots 42 are provided in connector 35 in connection with the above-mentioned further partial spherical shell, 43, serving again as a gimbal ring and shown in FIGS. 3 and 4. Spherical shell 43 being connected in connector 35 by pivot screws 39 and spherical shell 24 being connected in connector 35 by pivot screws 36 leads to the movement of one causing the other to move also. This occurs through the meshing of gear tooth set 32 on spherical shell 24 with a further gear tooth set, 44, on partial spherical shell 43 again provided in two separate parallel tracks with helical teeth set at a diagonal with respect to the direction of the tracks. Once again, this arrangement forms a gear tooth set operating much as a herringbone gear. Thus, if there is a motion of partial spherical shell 24 about the axis defined by the center of openings 33 therein where fastened by screws 36 to connector 35, gear sets 32 will force a corresponding motion of partial spherical shell 43 by force transmitted to gear sets 44 through opening 40 in connector 35. This motion of spherical shell 43 will be about an axis defined by the centers of a further pair of openings therein, 45, having threaded sides in spherical shell 43. During any such motion, parts of gear tooth sets 32 in the tracks will move in slots 41 of connector 35 and parts of gear tooth sets 44 will move in slots 42 of connector 35.

Spherical shell 43 is connected in the second partial spherical shell end of connector 35 by screws 39 extending through openings 38 in connector 35 into threaded openings 45 of shell 43. A further set of openings, 6, in partial spherical shell 43 have centers which define a further axis transverse to that axis defined by the centers of openings 45 therein. A set of lugs, 47, are provided on either side of openings 45 which may be used for connecting motions of force sensors or other items to the manipulable side of joint 12. An opening, 48, is provided through spherical shell 43 between the parallel tracks of gear tooth sets 44.

Helical teeth, 49, are again provided in two sets on the end surface of a further guide means, 50, provided for the manipulable side of joint 12 and shown in FIGS. 2A, 2B, 3 and 4. Gear teeth 49 are provided set diagonally with respect to the direction of the end surface at each location on opposite sides of connector 35. Together, they form an arrangement operating much like a herringbone gear. Guide means 50 again has part of ball bearing arrangements, 51, provided therein for attachment to extended manipulable supports. Lugs for a connection point, 52, are provided thereon, tough they need not be (and so shown in dashed line form), to permit connection of motion or force sensors or other items to the manipulable side of joint 12. The other portions of bearing arrangements 51 are shown in manipulable support extensions, 53A and 53B, which are rigidly fastened to a manipulable support, 54, to together form a manipulable extended support.

Manipulable support 54 has a truncated spherical portion, 55, as a part thereof elevated over an attachment portion which fits into the interior of partial spherical shell 43 to be fastened in openings 46 thereof by screws, 56, for holding a part of a corresponding bearing race, 57, through openings, 58, in truncated spherical portion 55 of manipulable support 54. Screws 56 extend through openings 58 into openings 46 of partial spherical shell 43 to complete the bearings and the connection of shell 43 to support 54. An opening, 59, extends through truncated spherical portion 55 to continue through support 54.

The cut away view of FIG. 4 provides a pictorial view as to how the separate piece shown in FIG. 3 are assembled. Additionally shown in FIG. 4 is the end portion of an actuator, 60. Actuator portion 60 is rotatably or pivotally connected to lugs 34 on partial spherical shell 24 to permit force to be transmitted therethrough to spherical shell 24, connector 35, spherical shell 43, to guide means 50 to be capable of causing it to move. Thus, in FIG. 4, guide means 50 is shown rotated with respect to guide means 20 by actuator portion 58 having been forced downward in FIG. 4. The separation between the tracks with gear tooth sets 32 and 44 on partial spherical shells 24 and 43, respectively, and the rigid connection in this axis provided by connector 35 between partial spherical shells 24 and 43, permits joint 12 to be very "stiff" with respect to forces about this axis. Connector 35 makes it possible to omit the use of diagonal gear teeth in gear tooth sets 32 and 44 and use straight-across spur gear teeth for economy while retaining reasonable stiffness. The herringbone mesh improves rotation smoothness and can improve joint "stiffness" by limiting the effects of bearing backlash in connector 35 rotating about screws 36.

Two side views of joint 12 are shown of sides orthogonal to one another in FIGS. 2A and 2B. In FIG. 2B, therefore, a further portion of another actuator, 61, is shown by which the manipulable side of joint 12 can be caused to rotate with respect to its other side in the orthogonal axis by having partial spherical shell 43 rotate with respect to partial spherical shell 24. Thus, force is transmitted through a portion of actuator 61 to guide means 20, and then to guide means 50 to cause, through connector 35, spherical shell 43 to rotate with respect to spherical shell 24. The wide separation between the end surfaces of guide means 20 and 50 with gear tooth sets 22 and 49 thereon, respectively, permits joint 12 to be very "stiff" with respect to forces about this axis which is orthogonal to the previously described axis about which responses occur to forces on actuator 60. The herringbone mesh prevents side-to-side shifts of guide means 20 and 50 with respect to one another.

The relationship of the various components of joint 12 can be better understood by cross section views of the joint. Such cross section views are indicated in FIGS. 2A and 2B, the first of these cross section views being shown in FIG. 5 which has been taken from FIG. 2A. The same designation is used in FIG. 5 for any particular component in joint 12 that was used in the previous figures in which it is shown.

Figure 5:
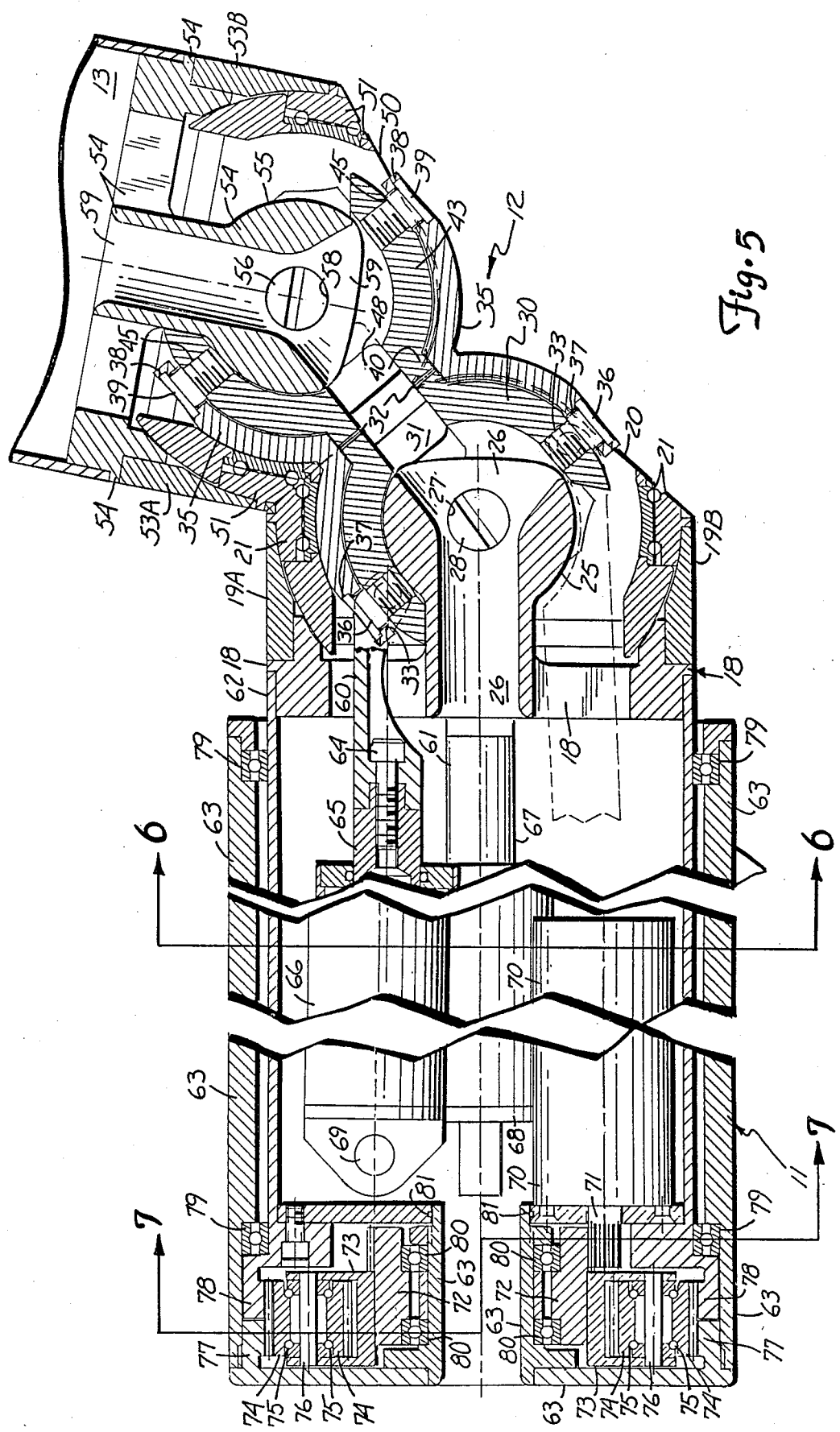
FIG. 5 shows a cross section view of the apparatus shown in FIG. 2A.

The cross section view of FIG. 5 is taken from FIG. 2A, but the manipulable side of joint 12 has been rotated along gear tooth sets 22 of guide means 20 and gear tooth sets 49 of guide means 50 in FIG. 5 through a leftward forcing of actuator 60 in that figure. Note that, although the foregoing described rotation has been shown in FIG. 5 as having already occurred, a completely open control passageway remains through joint 12. This passageway extends through opening 26 in base support 18, including through truncated spherical portion 25, through opening 31 of partial spherical shell 24, and opening 48 of partial spherical shell 43, these last two openings occurring within opening 40 of connector 35. The passageway then continues through opening 59 of manipulable support 54, including passing through truncated spherical portion 55 thereof. Thus, an electrical wiring harness or other control signal transmission means for controlling further portions of manipulator system 10 of FIG. 1 past joint 12 can be passed through joint 12 to reach those other portions despite rotations occurring therein.

A part of manipulator base 11 is also shown in cross section view in FIG. 5. Manipulator base 11 is comprised of two major cylinder-like portions, 62 and 63, which are connected to one another through a bearing and seal arrangement. As a result, inner cylinder-like portion 62, which is rigidly attached to joint 12, can be forced to rotate with respect to outer cylinder-like portion 63.

Actuator portion 60, connected to lugs 34 of partial spherical shell 24, extends into inner cylinder-like section 62 for attachment by a screw, 64, to a threaded sleeve, 65. Sleeve 65 is rotatably operated by screw threads on a motor shaft meshing with its threads to form a linear actuator, this portion of sleeve 65 and the shaft not being shown in FIG. 5. That motor shaft is part of, and rotatably operated by, an actuating motor, 66, to provide either a pushing or a pulling force on actuator 60. Both a pushing and a pulling force can be simultaneously applied to partial spherical shell 24 by alternatively adding the dashed line actuator shown in FIG. 5.

A similar arrangement is provided for actuator 61, though unseen for the most part in FIG. 5, which is connected to a threaded sleeve, 67, which is rotatably operated by screw threads on a motor shaft extending from, and rotatably operated by, a further motor, 68, to again form a linear actuator. Motor 66 is connected by a pivot arrangement, 69, which is fastened to inner cylinder-like portion 62. Motor 68 is similarly connected in a pivot arrangement. An advantage of the present arrangement is that actuators 60 and 61 need only be subject to forces along the axis thereof to permit the manipulable side of joint 12 to be forced to take any o its possible positions. No twisting, bending or other such action beyond pivoting, extension an contraction is required of any portion of the motors, the threaded shafts therein, the threaded sleeves, or the actuator extension portions in operating the manipulative side of joint 12.

A further motor, 70, is used to drive inner cylinder-like portion 62 in rotation with respect to outer cylinder-like portion 63. Motor 70 has an output shaft, 71, with gear teeth thereon to form a pinion gear which meshes with an inner spur gear, 72, in an epicyclic gear train. Inner gear 72 has three flanges, 73, rigidly attached thereto which carry corresponding planetary gears, 74, on bearings, 75, mounted on shafts, 76, rigidly attached to flanges 73 to form a planetary gear system.

Pinion gears 74 mesh with two outer ring gears, 77 and 78. Motor 70 is mounted in inner cylinder-like portion 62 which in turn is rigidly attached to outer ring gear 78. Outer ring gear 78 and inner cylinder-like portion 62 are together rotatably connected to outer cylinder-like portion 63 by a first pair of ball bearings, 79, a second pair of ball bearings, 80, and a seal, 81. Outer ring gear 77 is rigidly attached to outer cylinder-like portion 63.

Figure 6:
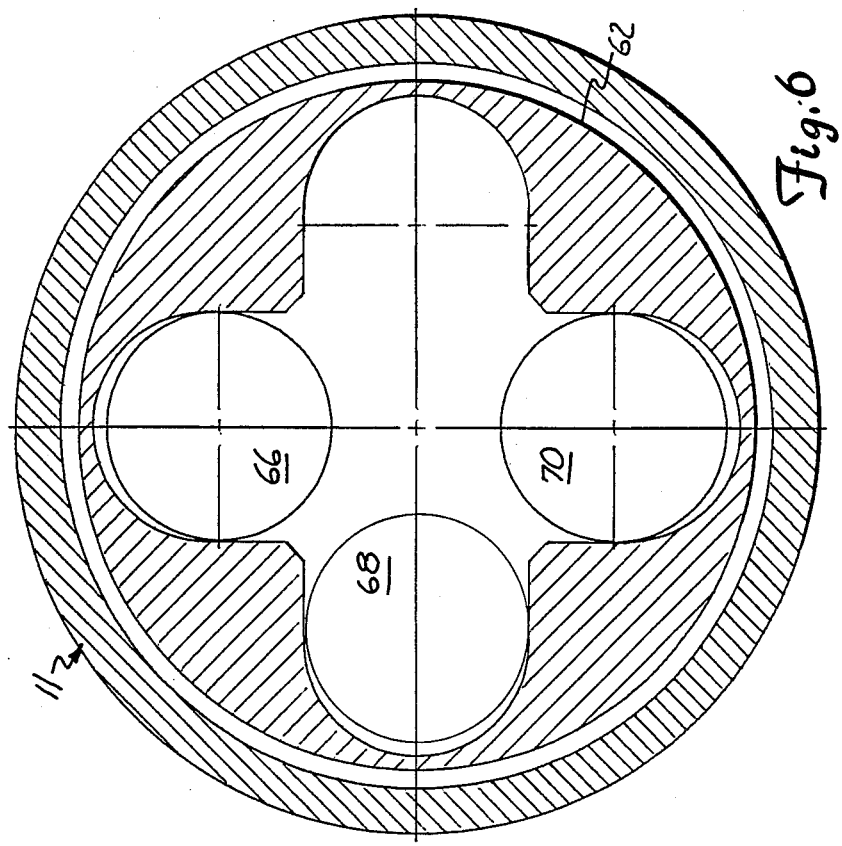
FIG. 6 shows a cross section view of the apparatus shown in FIG. 5.

The arrangement shown in FIG. 5 can be further seen in the cross section views taken therefrom, including FIG. 6. Thus, motor 66 is shown in the upper portion of FIG. 6 with motor 70 in the lower portion of FIG. 6. Motor 68 is in the left-hand portion of FIG. 6. Each of motors 66, 68 and 70 are shown mounted in inner cylinder-like portion 62. No detail of the motors themselves is shown in FIG. 6.

Figure 7:
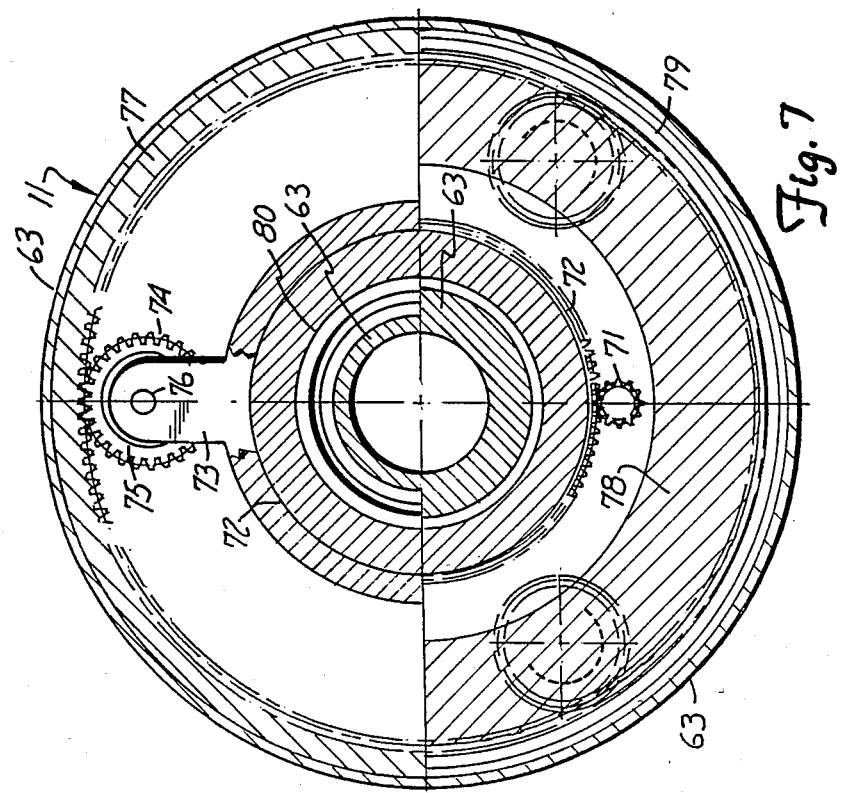
FIG. 7 shows a cross section view of the apparatus shown in FIG. 5, FIGS. 8A and 8B show cross section views of the apparatus shown in FIG. 2B in different positions.

FIG. 7, a cross section view also taken from FIG. 5, is a broken cross section view taken of portions of the planetary gear arrangement used to provide a speed reduction in rotating inner cylinder-like portion 62 with respect to outer cylinder-like portion 63, the latter being attached to the vertical pole in stand 17. Rotation of shaft 21 of motor 70 drives inner gear 72 which in turn forces planetary gears 74 along outer ring gear 77. The turning of planetary gears 74 along ring gear 77 in turn forces ring gear 778 to rotate and, as a result, rotating with it inner cylinder-like portion 62 in which motor 70 is mounted. The difference in tooth count on shaft 71 and gear 72, and between ring gears 77 and 78, determines the amount of speed reduction which can be provided between the angular rate of rotation of the shaft of the motor and the rate of rotation of the motor on inner cylinder-like portion 6 with respect to outer cylinder-like portion 63.

Figure 8B:
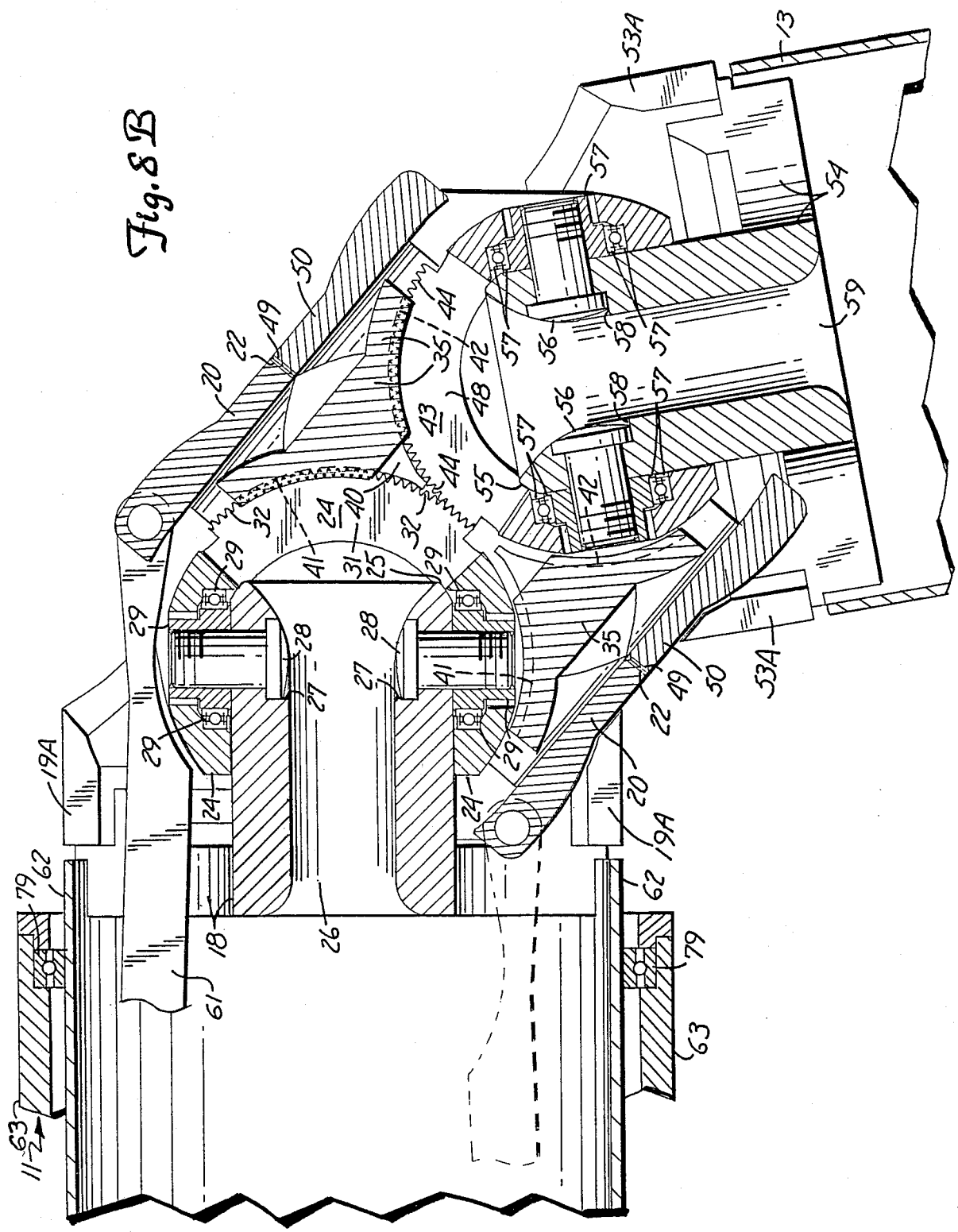

FIGS. 8A and 8B are the same cross section view taken from FIG. 2B, but with the manipulable end of joint 12 being at an angle with respect to the base support in FIG. 8B as opposed to being straight in FIGS. 2B and 8A. Again, the same designation is used here to identify a component in these figures as was used to identify the same component in the previous figures. This occurs because actuator 61 has had a force directed to the right applied to it in FIG. 8B to cause the rotation of partial spherical shell 43 with respect to partial spherical shell 24. Actuator 61 permits either a pushing force or a pulling force to be applied to achieve such a rotation. Alternatively, guide means 20 can have simultaneous pushing and pulling forces applied thereto with the addition of a further actuator means shown in dashed lines in FIGS. 8A and 8B.

At the other end of extension 13, there is provided elbow-like joint 14. FIGS. 9A and 9B show a side view and a top view of joint 14, respectively. An inner spur gear, 90, affixed to a cover and support bracket forms the base side of joint 14, and so this arrangement is fastened to extension 13. The manipulable side of joint 14 is fastened to extension 15, and can be see in FIG. 9B to be able to move within an opening, 91, present in the covering portion of inner spur gear 90. Extension 15 is specifically joined to the outside of an outer ring gear, 92, which is part of another epicyclic gear train along with inner spur gear 90. This gear train is required to permit a relatively short available linear motion of a linear actuator, used to operate joint 14, to result in a relatively large angular position change of extension 15 with respect to extension 13.

Figure 11:
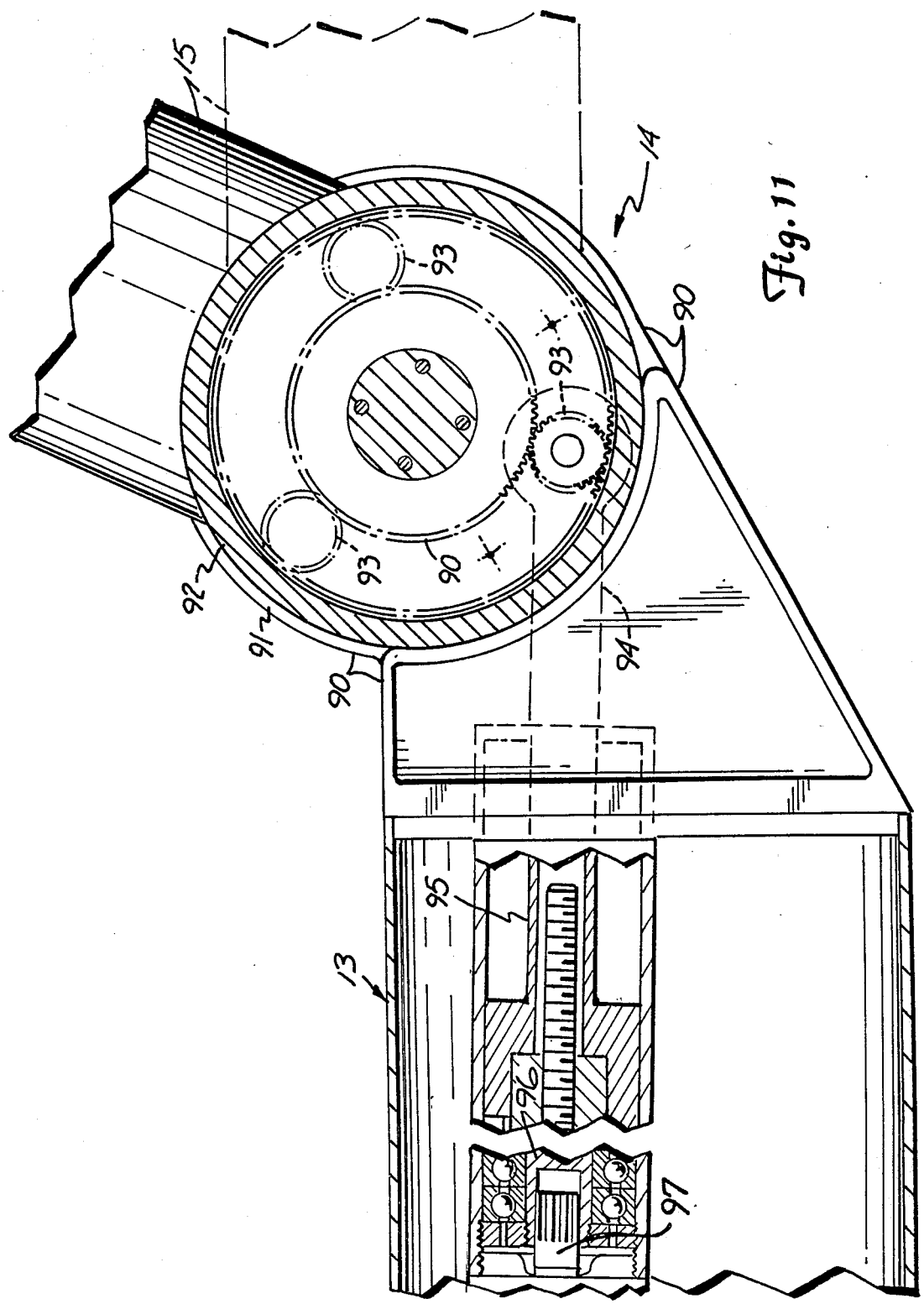
FIG. 11 shows a cross section view of the apparatus shown in FIG. 9B.

A cross section view of joint 14 is shown in FIG. 10 taken from FIG. 9A. Another cross section view of joint 14 is shown in FIG. 11 taken from FIG. 9B. As can be seen, inner spur gear 90 is joined with outer ring gear 92 in three ways. First, three planetary gears, 93, are provided between inner spur gear 90 and outer ring gear 92. The choice of the number of teeth on inner spur gear 90, planetary gears 93, and outer ring gear 92 determine the amount of distance that the selected planetary gear 93 in FIG. 11, connected to an actuator portion, 94, must move to provide a desired angular change of extension 15 with respect to extension 13.

Actuator portion 94 is pivotally connected to the shaft of a selected one of planetary gears 93 as a basis for angularly positioning extension 15, as indicated above and in FIG. 11. The other end of actuator 94 is connected to a threaded sleeve, 95, which again is rotatably operated by threads on a motor shaft, 96, meshing with its threads. Shaft 96 extends from a motor actuator. 97, to together form a linear actuator with sleeve 95. Motor 96 is pivotally connected to extension 13 and, again, need only extend and contract without any twisting motion to angularly position extension 15 with respect to extension 13.

Inner spur gear 90 is also in contact with outer ring gear 92 in two further arrangements. Two bearings, 98, are provided to permit outer ring gear 92 to rotate about inner spur gear 90 when driven by a force on one of planetary gears 93. In addition, a pair of seals, 99, are used to enclose the space between portions of inner spur gear 90 and outer ring gear 92. Again, there is an opening through joint 14 for a wiring harness or other control signal means to extend therethrough. The harness need only follow along actuator portion 94 to pass through this opening.

Figure 12:
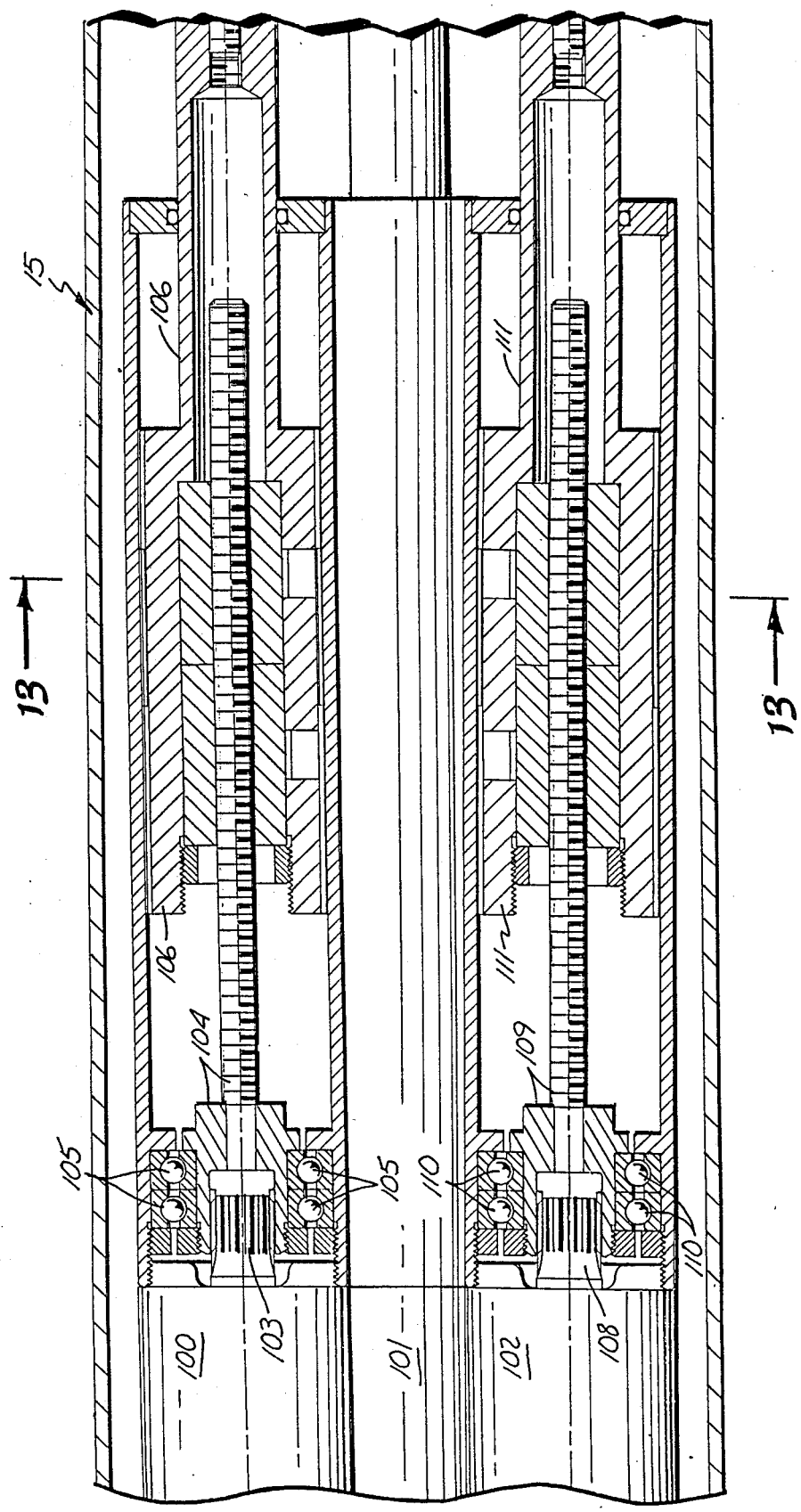
FIG. 12 shows a cross section view of the apparatus shown in FIG. 1.
Figure 13:
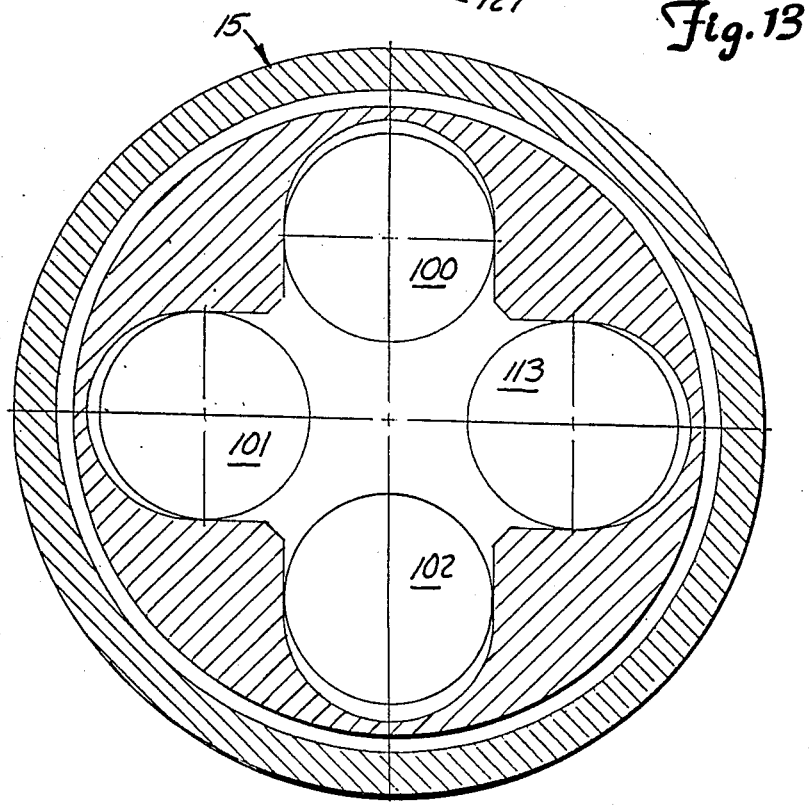
FIG. 13 shows a cross section view of the apparatus shown in FIG. 12.
Figure 14:
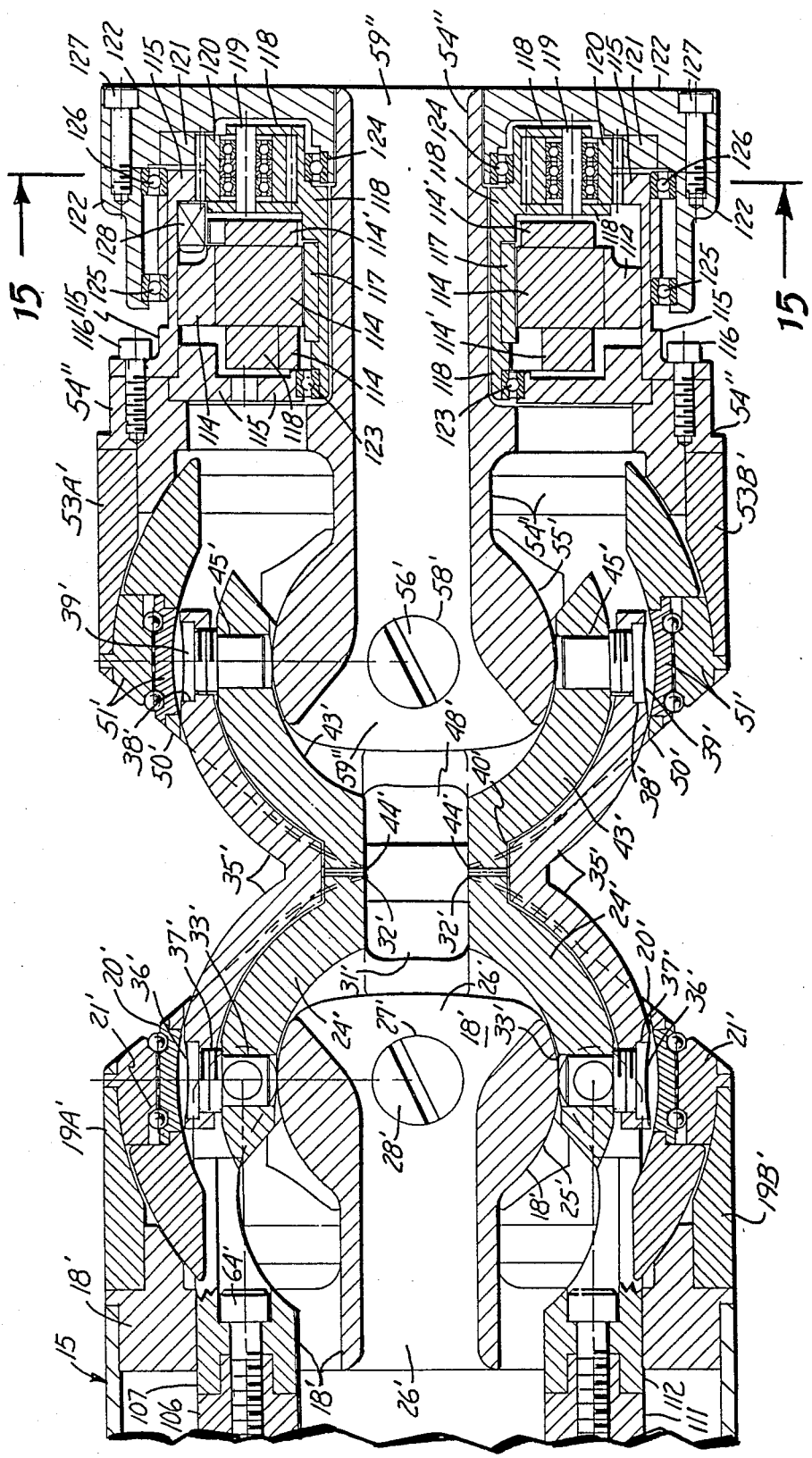
FIG. 14 shows a cross section view of the apparatus shown in FIG. 1.

Extension 15 has attached to the other end thereof a further joint, a wrist-like joint, 16. Joint 16 is of the same construction as is joint 12, although a different construction between these two joints is not precluded in the manipulator of FIG. 1. The actuators for joint 16 are mounted in extension 15 from where they extend to joint 16. A cross section view of extension 15 is shown in FIG. 12 taken from FIG. 1. A further cross section view of extension 15 is shown in FIG. 13 taken from FIG. 12. Joint 16 is shown in FIG. 14.

FIG. 12 shows three of the four linear actuators present in extension 15, only these three can be seen as the other has been eliminated by the section chosen. These linear actuators are operated by three motors, these being 100, 10 and 102. Parts of motors 100 and 102 are shown in cross section, only the exterior being shown of motor 101. Motor 101 has a shaft, 103, extending therefrom with teeth provided thereon which engage a ring gear and screw arrangement, 104. The ring gear of this arrangement turns within a set of bearings, 105. The threaded shaft in ring gear and screw arrangement 104 is connected to a threaded sleeve, 106, so that rotation of the motor rotatably operates the shaft causing the sleeve to move away from motor 100 or toward motor 100 depending on the direction of rotation. The opposite end of threaded sleeve 106 is connected to an actuator portion, 107, connected to joint 16 as can be seen in FIG. 14.

An identical arrangement is used in connection with motor 102 which has a shaft extending therefrom with threads on the en, 108. A similar ring gear and screw arrangement, 109, has its ring gear operating inside similar bearings, 110. The threaded shaft portion rotatably operates a similar threaded sleeve, 111. Threaded sleeve 111 is connected to an actuator portion, 112, also connected to joint 16 as can be seen in FIG. 14.

The relative positions of motors 100, 101 and 102 can be seen in FIG. 13 as can a further motor, 113, the one missing from the cross section view in FIG. 12. Motors 100 and 102 lead to actuator portions 106 and 112 which are connected to opposite sides of a partial spherical shell, 24', serving as a gimbal ring and driving element on the base side of joint 16 in FIG. 14, and corresponding to partial spherical shell 24 of joint 12. The components shown in FIG. 14 generally have the same designations there that were used for the corresponding component in joint 12 in the previous figures, but a prime mark has been added to them to distinguish joint 16 components from joint 12 components with a few exceptions. One of these exceptions is the use of the designation 106 for an actuator portion in FIG. 14 as opposed to the designation 60 used in FIG. 5.

The linear actuators extending from motors 101 and 113 are connected to and operate a guide means, 20', on the base side of joint 16 corresponding to guide means 20 for joint 12. However, in FIG. 14, the connections to guide means 20' cannot be seen as one is eliminated in the section chosen for cross section view, and the other is hidden behind the structure shown in that view.

Joint 16 operates in all particulars just as did joint 12. The one difference shown is the actual use in joint 16 of simultaneous pushing and pulling linear actuators, or a pair of linear actuators, to operate both partial spherical shell 24' about the axis around which it can rotate and guide means 20' about the axis around which it can rotate. This manner of joint actuation is a matter of choice, as indicated for joint 12, there being a greater "stiffness" and better precision in the joint operated in this manner but at a greater economic cost.

A further exception in the designation scheme in FIG. 14 for joint 16, as compared to that used for joint 12 in previous figures, occurs in connection with the support on the manipulable side of joint 16. Manipulable support 54 of joint 12 in previous figures has been modified in joint 16 of FIG. 14 to increase the length of the structure surrounding the central opening beginning in the truncated spherical portion thereof and extending through the remainder of that support. Thus, in FIG. 14, the manipulable support has been redesignated 54" with the central opening therein being redesignated 59". The remaining designations for other portions of that manipulable support remain true to the above description therefor, that being the numbers used in connection with joint 12 for the corresponding portion with a single prime mark added thereto.

The added tubular portion, or the structure surrounding opening 59", extending farther to the right in joint 16 of FIG. 14 compared to its extent in joint 12 is used to mount a motor and an epicyclic gear train. These additions permit having a rotation capability to the right of joint 16 in FIG. 14, or beyond joint 16 in FIG. 1. Thus, this portion can be rotated independently of having to rotate the entire arm, a capability which was provided by the motor and epicyclic gear train shown in FIGS. 5 and 7 in connection with base 11 of FIG. 1.

The motor just made reference to as being to the right of joint 16 in FIG. 14 has a pole arrangement, 114, with windings thereon, 114', to form its stator mounted on a bracket including a first outer ring gear, 115, and attached by screws, 116, to portions of manipulable support 54". The rotor for this motor is formed of a permanent magnet, 117, which is mounted in an extended central sleeve of a carrier plate, 118. Carrier plate 118 has three shafts, 119, mounted therein to each carry a planetary gear, 120. Planetary gears 120 mesh with both the first outer ring gear 115 in the first ring gear bracket and a second outer ring gear, 121, mounted in a rotatable end piece, or tool mount, 122.

Carrier 118 can rotate with respect to first outer ring gear bracket 115 through a bearing, 123, provided therebetween. Carrier 118 can also rotate with respect to tool mount 122 because of a further bearing, 124. Finally, end piece 122 can rotate with respect to first outer ring gear bracket 115 through the use of two further bearings, 125 and 126. The portion of end piece 122 supporting these bearings is attached to the rest of end piece 122 by screws, 127.

Figure 15:
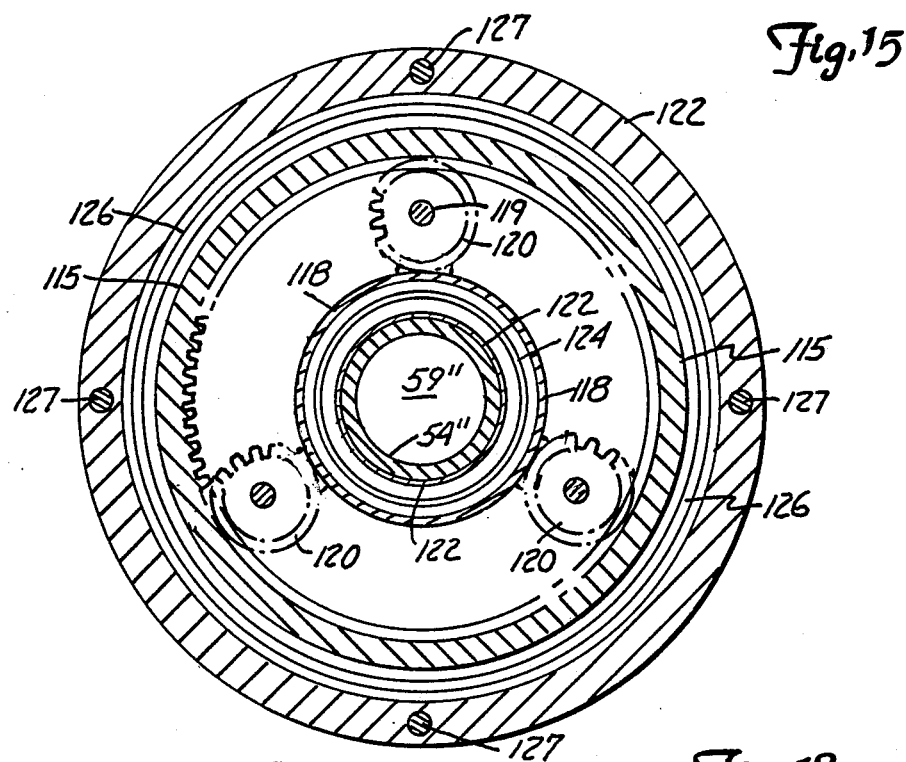
FIG. 15 shows a cross section view of the apparatus shown in FIG. 14.

A cross section view is shown of this epicyclic gear train in FIG. 15 taken from FIG. 14. The provision of power to the windings 114' of the motor causes carrier 118 to rotate carrying gears 120 along with it. Gears 120 turn in the teeth of the first outer ring gear in bracket 115 and force second outer ring gear 121 to rotate along with tool mount 122. Either direction of rotation can be achieved depending on the direction of the electrical current supplied to windings 114'. A position sensor, 128, is shown for determining the position or the speed of rotation of tool mount 122, or both.

The necessary interconnections to coils 114' and to position sensor 128 can be routed through the openings shown in the structure supporting the motor stator into opening 59" in manipulable support 54" and then through opening 48' in the corresponding spherical shell, 43', and opening 31' in spherical shell 24' (and through opening 40' of connector 35'), and finally through opening 26' in base support 18' no matter what position is taken by joint 16. These interconnections can be combined with those from actuator motors 100, 101, 102 and 113 to be routed back through the openings in elbow-like joint 14 and shoulder-like joint 12 in the manner previously described. Thus, interconnections to provide control signals for all of the actuators and sensors for all of the relatively movable components in all of the joints of mechanical manipulator 10, and in additional axial rotational arrangements, can easily be installed.

Joints 12, 14 and 16, operating under such electrical control, can provide a very wide range of motion for mechanical manipulator 10 with respect to base 11 in addition to permitting the entire arm-like structure to rotate or to have the tool mount at the end alone rotate. Graphical representations in FIGS. 16 and 17 show to a considerable extent the motion permitted mechanical manipulator 10. As can be seen in the side view shown in FIG. 16, the movement permitted in the elevation axis is on the order of three-quarters of a circle. The motion permitted tool mount 122 in the azimuthal plane, shown in the top view of FIG. 17, is nearly a half circle with the arm extended. In addition, with the arm joints bent appropriately, a lobe of motion is available to a mount 122 along base 11 behind shoulder joint 12. This extraordinary range of motion is achieved in a smoothly movable manipulator without any hitches occurring in that motion and with no singularities in its range.

Although the present invention has been described with reference to preferred embodiments, workers skilled in the art will recognize that changes may be made in form and detail without departing from the spirit and scope of the invention.

What is claimed is:

1. A robotic manipulator operable from a manipulator base, said manipulator comprising:
   a first joint comprising:
      a first joint base support joined with said manipulator base;
      a first joint base orthogonal pivot connection means rotatably connected to said first joint base support about a first axis;
      a first joint pivot connector joining means rotatably connected to said first joint base orthogonal pivot connection means about a second axis substantially orthogonal to said first axis;
      a first joint manipulable orthogonal pivot connection means rotatably connected to said first joint pivot connector joining means about a third axis substantially parallel to said second axis, said first joint manipulable orthogonal pivot connection means being movably joined also with said first joint base orthogonal pivot connection means;
      a first joint manipulable support rotatably connected to said first joint manipulable orthogonal pivot connection means about a fourth axis substantially orthogonal to said third axis;
      a first joint base guide means positioned about said first joint base orthogonal pivot connection means and rotatably connected to said first joint base support about a fifth axis substantially parallel to said second axis; and
      a first joint manipulable guide means positioned about said first joint manipulable orthogonal pivot connection means and rotatably connected to said first joint manipulable support about a sixth axis substantially parallel to said third axis, said first joint manipulable guide means being movably joined with said first joint base guide means on either side of said first joint pivot connector joining means.

2. The apparatus of claim 1 wherein said first joint manipulable support is connected through a first extension means to a second joint capable of movement with respect thereto.

3. The apparatus of claim 1 wherein said first joint manipulable orthogonal pivot connection means is movably joined with said first joint base orthogonal pivot connection means, as aforesaid, through at least one opening in said first joint pivot connector joining means.

4. The apparatus of claim 1 wherein said first joint manipulable guide means is movably joined with said first joint base guide means, as aforesaid, through being in direct contact with one another.

5. The apparatus of claim 1 wherein said first joint base support has a portion thereof formed substantially as a truncated sphere to which said first joint base orthogonal pivot connecting means is rotatably connected, as aforesaid.

6. The apparatus of claim 1 wherein said first joint further comprises first joint first and second force imparting means, said first joint first force imparting means being rotatably connected to said first joint base orthogonal pivot connection means to be capable of selectively applying force thereto, said first joint second force imparting means being rotatably connected to said first joint base guide means to be capable of selectively applying force thereto.

7. The apparatus of claim 2 wherein portions of said second joint have freedom to rotate to at least some extent about a selected axis with respect to other portions thereof.

8. The apparatus of claim 2 wherein said second joint is connected through a second extension means to a third joint capable of movement with respect thereto.

9. The apparatus of claim 3 wherein said first joint manipulable orthogonal pivot connection means is movably joined with said first joint base orthogonal pivot connection means through at least one opening in said first joint pivot connector joining means through having gear teeth on said first joint manipulable orthogonal pivot connection means meshing with gear teeth on said first joint base orthogonal pivot connection means.

10. The apparatus of claim 4 wherein said first joint manipulable guide means is in direct contact with said first joint base guide means through having gear teeth on said first joint manipulable guide means meshing with gear teeth on said first joint base guide means.

11. The apparatus of claim 5 wherein said first joint base orthogonal pivot connection means has a portion formed substantially as a portion of a spherical shell positioned substantially concentrically about said truncated sphere.

12. The apparatus of claim 6 wherein said first joint base support is joined with said manipulator base, as aforesaid, in a connection permitting them to rotate with respect to one another through use of a first bearing means, and wherein said first joint further comprises a first joint third force imparting means mounted on said first joint base support and joined with said manipulator base in such a manner so as to permit said first joint third force imparting means to force said first joint base support to rotate with respect to said manipulator base.

13. The apparatus of claim 6 wherein said first joint first force imparting means comprises a first motor means and a first linear actuator rotatably connected to said first joint base orthogonal pivot connection means, and wherein said first joint second force imparting means comprises a second motor means and a second linear actuator rotatably connected to said first joint base guide means.

14. The apparatus of claim 6 wherein said first joint further comprises first joint third and fourth force imparting means, said first joint third force imparting means being rotatably connected to said first joint base orthogonal pivot connection means substantially opposite said first joint first force imparting means, and said first joint fourth force imparting means being rotatably connected to said first joint base guide means substantially opposite said first joint second force imparting means.

15. The apparatus of claim 7 wherein said second joint is formed of a second joint first member that is connected to said first extension means, and that is also rotatably connected to a second joint second member to permit rotation about said selected axis.

16. The apparatus of claim 8 wherein portions of said third joint have freedom to rotate to at least some extent about a selected axis with respect to other portions thereof.

17. The apparatus of claim 9 wherein said gear teeth on said first joint manipulable orthogonal pivot connection means are provided in two separate tracks substantially parallel to each other and to said fourth axis to mesh with said gear teeth on said first joint base orthogonal pivot connection means there provided also in two separate corresponding tracks substantially parallel to one another and to said first axis.

18. The apparatus of claim 10 wherein said first joint manipulable guide means is formed substantially as a cylindrical shell with portions of an end thereof on either side of said first joint pivot connector joining means being movably joined with said first joint base guide means, as aforesaid, through having a set of said gear teeth provided at each of two locations on said end where in direct contact with said first joint base guide means, and with said end being curved in following a circular arc about an axis substantially orthogonal to said sixth axis at each of those said two locations thereon, and wherein said first joint base guide means is formed substantially as a cylindrical shell with portions of an end thereof on either side of said first joint pivot connector joining means being movably joined with said first joint base guide means, as aforesaid, through having a set of said gear teeth provided at each of two locations on said end where in direct contact with said first joint manipulable guide means, and with said end being curved in following a circular arc about an axis substantially orthogonal to said fifth axis at each of those said two locations thereon.

19. The apparatus of claim 11 wherein said first joint manipulable support has a portion thereof formed substantially as a truncated sphere to which said first joint manipulable orthogonal pivot connection means is rotatably connected, as aforesaid.

20. The apparatus of claim 11 wherein said first joint base guide means has a portion formed substantially as a cylindrical shell.

21. The apparatus of claim 13 wherein said first motor means and said second motor means are mounted on said first joint base support.

22. The apparatus of claim 15 wherein said second joint second member is connected to a second extension means, and a second joint force imparting means is mounted on a selected one of said first and second extension means and movably joined with that one of said second joint first and second members connected to that one of said first and second extension means opposite to that one on which said second joint first force imparting means is mounted.

23. The apparatus of claim 16 wherein said third joint further comprises:
a third joint base support connected to said second extension means;
a third joint base orthogonal pivot connection means rotatably connected to said third joint base support about a first axis;
a third joint pivot connector joining means rotatably connected to said third joint base orthogonal pivot connection means about a second axis substantially orthogonal to said first axis;
a third joint manipulable orthogonal pivot connection means rotatably connected to said third joint pivot connector joining means about a third axis substantially parallel to said second axis, said third joint manipulable orthogonal pivot connection means being movably joined also with said third joint base orthogonal pivot connection means;
a third joint manipulable support rotatably connected to said third joint manipulable orthogonal pivot connection means about a fourth axis substantially orthogonal to said third axis;
a third joint base guide means positioned about said third joint base orthogonal pivot connection means and rotatably connected to said third joint base support about a fifth axis substantially parallel to said second axis; and
a third joint manipulable guide means positioned abut said third joint manipulable orthogonal pivot connection means and rotatably connected to said third joint manipulable support about a sixth axis substantially parallel to said third axis, said third joint manipulable guide means being movably joined with said third joint base guide means on either side of said third joint pivot connector joining means.

24. The apparatus of claim 17 wherein said gear teeth along one of said tracks are helical gear teeth.

25. The apparatus of claim 18 wherein said gear teeth at one of said locations on one of said ends are helical gear teeth.

26. The apparatus of claim 19 wherein said first joint manipulable orthogonal pivot connection means has a portion formed substantially as a portion of a spherical shell positioned substantially concentrically with said truncated sphere serving as a part of said first joint manipulable support.

27. The apparatus of claim 20 wherein said first joint manipulable guide means has a portion formed substantially as a cylindrical shell.

28. The apparatus of claim 20 wherein said cylindrical shell forming said first joint base guide means has an end thereof such that at two locations thereon, one on either side of said first joint pivot connector joining means, that end is there curved in following a circular arc about an axis substantially orthogonal to said fifth axis.

29. The apparatus of claim 22 wherein said second joint force imparting means comprises a first motor means and a first linear actuator, said first linear actuator being rotatably connected to a selected one of said second joint first and second members.

30. The apparatus of claim 23 wherein said third joint further comprises third joint first and second force imparting means, said third joint first force imparting means being rotatably connected to said third joint base orthogonal pivot connection means to be capable of selectively applying force thereto, said third joint second force imparting means being rotatably connected to said third joint base guide means to be capable of selectively applying force thereto.

31. The apparatus of claim 24 wherein said gear teeth along each of said tracks in that pair on said first joint manipulable orthogonal pivot connection means and in that pair of said first joint base orthogonal pivot connection means form a separated herringbone gear tooth set.

32. The apparatus of claim 25 wherein that pair of said sets of gear teeth at both of said two locations on said end of said first joint manipulable guide means and that pair of said sets of gear teeth at both of said two locations on said end of said first joint base guide means as a pair form a separated herringbone gear tooth set.

33. The apparatus of claim 26 wherein said first joint pivot connector joining means has that end thereof connected to said first joint base orthogonal pivot connection means being formed substantially as a portion of a spherical shell positioned substantially concentrically about that said spherical shell serving as said joint base orthogonal pivot connection means, and with that other end of said first joint pivot connector joining means that is connected to said first joint manipulable orthogonal pivot connection means also formed substantially as a portion of a spherical shell positioned substantially concentrically about that said spherical shell serving as said first joint manipulable orthogonal pivot connection means, with said opening in said first joint pivot connector joining means extending between said spherical shell portions forming either end thereof.

34. The apparatus of claim 27 wherein said cylindrical shell serving as a portion of said first joint base guide means has an end thereof such that at two locations thereon, one on either side of said first joint pivot connector joining means, that end is there curved in following a circular arc about an axis substantially orthogonal to said fifth axis, and wherein said cylindrical shell serving as a portion of said fist joint manipulable guide means has an end thereof such that at two locations thereon, one on either side of said first joint pivot connector joining means, that end is there curved in following a circular arc about an axis substantially orthogonal to said sixth axis.

35. The apparatus of claim 28 wherein said end of said cylindrical shell, at further locations thereon between said two locations thereon, dips closer toward an opposite end of said cylindrical shell serving as part of said first joint base guide to be closer to that said opposite end at those further locations than are said circular arcs at said two locations thereon.

36. The apparatus of claim 30 wherein said third joint further comprises third joint third and fourth force imparting means, said third joint third force imparting means being rotatably connected to said third joint base orthogonal pivot connection means substantially opposite said third joint first force imparting means, and said third joint fourth force impairing means being rotatably connected to said third joint base guide means substantially opposite said third joint second force imparting means.

37. The apparatus of claim 30 wherein said third joint manipulable support has an end portion thereof opposite remaining portions of said third joint which is rotatable with respect to such remaining portions of said third joint manipulable support.

38. The apparatus of claim 33 wherein said first joint base guide means has a portion formed substantially as a cylindrical shell.

39. The apparatus of claim 34 wherein said end of said cylindrical shell serving as a portion of said first joint base guide means, at further locations thereon between said two locations thereon, dips closer to an opposite end thereof to be closer .to that said opposite end at those further locations than are said circular arcs at said two locations thereon, and wherein said end of said cylindrical shell serving as a portion of said first joint manipulable guide means, at further locations therein between said two locations thereon, dips closer to an opposite end thereof to be closer to that said opposite end at those further locations than are said circular arcs at said two locations thereon.

40. The apparatus of claim 36 wherein said third joint first, second, third and fourth force imparting means are each formed of a motor means mounted in said second extension means, and a corresponding linear actuator.

41. The apparatus of claim 38 wherein said first joint manipulable guide means has a portion formed substantially as a cylindrical shell.

42. The apparatus of claim 41 wherein said cylindrical shell serving as apportion of said first joint base guide means has an end thereof such that at two locations thereon, one on either side of said first joint pivot connector joining means, that end is there curved in following a circular arc about an axis substantially orthogonal to said fifth axis, and wherein said cylindrical shell serving as a portion of said first joint manipulable guide means has an end thereof such that at two locations thereon, one on either side of said first joint pivot connector joining means, that end is there curved in following a circular arc about an axis substantially orthogonal to said sixth axis.

43. The apparatus of claim 42 wherein said end of said cylindrical shell serving as a portion of said first joint base guide means, at further locations thereon between said two locations thereon, dips closer to an opposite end thereof to be closer to that said opposite end of those further locations than are said circular arcs at said two locations thereon, and wherein said end of said cylindrical shell serving as a portion of said first joint manipulable guide means, at further locations thereon between said two locations thereon, dips closer to an opposite end thereof to be closer to that said opposite end at those further locations than are said circular arcs at said two locations thereon.

44. A robotic manipulator operable from a manipulator base, said manipulator comprising:
a plurality of movable joints each capable of having a portion thereof angularly moveable about at least two substantially different axes;
an extension means joining two of said joints;
a first rotary coupling located between said manipulator base and a first joint, said first rotary coupling being capable of permitting those portions of said manipulator connected thereto on a side opposite of said manipulator base to rotate with respect to said manipulator base; and
a second rotary coupling separated from said first rotary coupling by at least two of said joints and said extension, said second rotary coupling being capable of permitting any structure connected thereto on a side thereof opposite said extension to rotate with respect to said extension.

* * * * *

UNITED STATES PATENT AND TRADEMARK OFFICE
CERTIFICATE OF CORRECTION

PATENT NO. : 4,911,033
DATED : March 27, 1990
INVENTOR(S) : Mark E. Rosheim et al.

It is certified that error appears in the above-identified patent and that said Letters Patent is hereby corrected as shown below:

Col. 14, line 37, delete "abut", insert --about--

Col. 16, line 28, delete "apportion", insert --a portion--

Signed and Sealed this

Eighth Day of October, 1991

Attest:

HARRY F. MANBECK, JR.

*Attesting Officer*          *Commissioner of Patents and Trademarks*